(12) United States Patent
Killamsetti et al.

(10) Patent No.: US 11,461,299 B2
(45) Date of Patent: Oct. 4, 2022

(54) KEY-VALUE INDEX WITH NODE BUFFERS

(71) Applicant: HEWLETT PACKARD ENTERPRISE DEVELOPMENT LP, Houston, TX (US)

(72) Inventors: Praveen Killamsetti, San Jose, CA (US); Anirudha Kumar, San Jose, CA (US); Rajat Sharma, San Jose, CA (US); Ammar Ekbote, San Jose, CA (US); Kumar Thangavelu, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/916,623

(22) Filed: Jun. 30, 2020

(65) Prior Publication Data

US 2021/0406235 A1  Dec. 30, 2021

(51) Int. Cl.
*G06F 16/22* (2019.01)

(52) U.S. Cl.
CPC ...... *G06F 16/2246* (2019.01); *G06F 16/2228* (2019.01); *G06F 16/2272* (2019.01)

(58) Field of Classification Search
CPC ............. G06F 16/2228; G06F 16/2246; G06F 16/2272; G06F 16/2282; G06F 16/23
See application file for complete search history.

(56) References Cited

U.S. PATENT DOCUMENTS

| | | | |
|---|---|---|---|
| 8,285,918 | B2 | 10/2012 | Maheshwari |
| 8,566,519 | B2 | 10/2013 | Lay et al. |
| 8,627,026 | B2 | 1/2014 | Domyo et al. |
| 8,719,488 | B2 | 5/2014 | Maheshwari |
| 9,514,054 | B2 | 12/2016 | Speer et al. |
| 9,753,854 | B1 | 9/2017 | Bao |
| 9,910,784 | B2 | 3/2018 | Maheshwari |
| 9,916,241 | B2 | 3/2018 | McKean et al. |
| 10,042,710 | B2 | 8/2018 | Mutalik et al. |
| 10,067,796 | B1 | 9/2018 | Metcalf |
| 9,977,746 | B2 | 10/2018 | Muppalaneni et al. |

(Continued)

FOREIGN PATENT DOCUMENTS

| | | |
|---|---|---|
| CN | 105404596 A | 3/2016 |
| CN | 107193758 A | 9/2017 |

(Continued)

OTHER PUBLICATIONS

Bradley C. Kuszmaul, "How Fractal Trees Work," Talk at CRIBB, Nov. 4, 2011, pp. 1-52.

(Continued)

*Primary Examiner* — James E Richardson
(74) *Attorney, Agent, or Firm* — Hewlett Packard Enterprise Patent Department

(57) ABSTRACT

A computer implemented method may include: receiving write requests to add key-value pairs to an index; storing the key-value pairs in a buffer of an indirect node of the index; determining whether the buffer of the indirect node exceeds a threshold level; and in response to a determination that the buffer of the indirect node exceeds the threshold level, transferring the key-value pairs stored in the buffer of the indirect node to buffers of a plurality of child nodes, where each buffer of the plurality of child nodes is smaller than the buffer of the indirect node.

20 Claims, 16 Drawing Sheets

(56) References Cited

U.S. PATENT DOCUMENTS

| | | | |
|---|---|---|---|
| 10,169,365 | B2 | 1/2019 | Maheshwari |
| 10,216,638 | B2 | 2/2019 | Maheshwari et al. |
| 10,372,687 | B1 | 8/2019 | Armangau et al. |
| 10,402,394 | B2 | 9/2019 | Pendharkar et al. |
| 10,776,276 | B2 | 9/2020 | Shergill et al. |
| 11,030,107 | B2 | 6/2021 | Shergill et al. |
| 2011/0023027 | A1 | 1/2011 | Kegel et al. |
| 2011/0040732 | A1 | 2/2011 | Anglin et al. |
| 2011/0246503 | A1* | 10/2011 | Bender ............... G06F 16/258 707/769 |
| 2011/0283048 | A1 | 11/2011 | Feldman et al. |
| 2013/0304991 | A1 | 11/2013 | Boettcher et al. |
| 2013/0339319 | A1 | 12/2013 | Woodward et al. |
| 2014/0351388 | A1 | 11/2014 | Srinivasan et al. |
| 2015/0100717 | A1 | 4/2015 | Bennett et al. |
| 2015/0347477 | A1 | 12/2015 | Esmet |
| 2015/0347547 | A1 | 12/2015 | Kasheff et al. |
| 2017/0212680 | A1 | 7/2017 | Waghulde |
| 2018/0011892 | A1 | 1/2018 | Kimura |
| 2018/0121362 | A1 | 5/2018 | Garg et al. |
| 2018/0150392 | A1 | 5/2018 | Booss et al. |
| 2018/0225315 | A1 | 8/2018 | Boles et al. |
| 2019/0095457 | A1* | 3/2019 | Gupta ................ G06F 16/185 |
| 2019/0095460 | A1 | 3/2019 | Wang et al. |
| 2019/0129970 | A1 | 5/2019 | Armangau et al. |
| 2019/0164612 | A1 | 5/2019 | Solanki et al. |
| 2019/0370239 | A1 | 12/2019 | Gupta et al. |
| 2020/0089617 | A1 | 3/2020 | Onishi et al. |
| 2020/0089788 | A1 | 3/2020 | Johnson et al. |
| 2020/0151268 | A1* | 5/2020 | Johnson ............. G06F 16/2282 |
| 2020/0233801 | A1 | 7/2020 | Gupta et al. |
| 2020/0241784 | A1 | 7/2020 | Mayo et al. |
| 2020/0250148 | A1 | 8/2020 | Dayan et al. |
| 2020/0341889 | A1 | 10/2020 | Idreos et al. |
| 2020/0341909 | A1 | 10/2020 | Vanninen et al. |
| 2021/0034584 | A1 | 2/2021 | Dalmatov et al. |

FOREIGN PATENT DOCUMENTS

| | | | |
|---|---|---|---|
| CN | 106708749 | | 8/2019 |
| WO | WO-2013054588 A1 * | 4/2013 | ......... G06F 16/9027 |

OTHER PUBLICATIONS

Bradley C. Kuszmaul, "How TokuDB Fractal Tree™ Indexes Work," Guest Lecture in MIT 6.172 Performance Engineering, Nov. 18, 2010, 40 pages.

Jannen et al., "BetrFS: A Right-optimized Write-optimized File System", 13th USENIX Conference on File and Storage Technologies (FAST '15), Feb. 16-19, 2015, 16 pages.

Bender, M. A., et al.; "An Introduction to Bε-trees and Write-Optimization"; Oct. 2015; 8 pages.

Callaghan, M.; "Read, write & space amplification—pick 2"; Nov. 23, 2015; 2 pages.

Dayan, N., et al.; "Dostoevsky: Better space-time trade-offs for LSM-tree based key-value stores via adaptive removal of superfluous merging"; May 2018; 16 pages.

Dayan, N., et al.; "Monkey: Optimal navigable key-value store"; May 2017; 16 pages.

Kaiyrakhmet, O. et al.; "SLM-Db: Single-level Key-value Store with Persistent Memory"; Feb. 25-28, 2019; 16 pages.

Percona; "TokuDB Variables"; 30 pages; printed on Dec. 16, 2019 from webpage: https://www.percona.com/doc/percona-server/LATEST/tokudb/tokudb_variables.html.

Wu, X. et al.; "LSM-TRIE: An LSM-tree-based Ultra-large Key-value Store for Small Data"; Jul. 8-10, 2015; 13 pages.

Bradley C. Kuszmaul, "A Comparison of Fractal Trees to Log-Structured Merge (LSM) Trees," Apr. 22, 2014, White Paper, pp. 1-15, <http://www.pandademo.com/wp-content/uploads/2017/12/A-Comparison-of-Fractal-Trees-to-Log-Structured-Merge-LSM-Trees.pdf>.

Dayan, N., "Optimal Bloom Filters and Adaptive Merging for LSM-Trees," ACM Transactions on Database Systems, vol. X, No. X, Article X. Publication date: Dec. 2018, p. 46.

Dayan, N., "The Log-Structured Merge-Bush & the Wacky Continuum," SIGMOD, Jun. 30, 2019, pp. 449-466.

Hellerstein, J. M., "Adaptive Query Processing: Technology in Evolution," 2000, IEEE Computer Society Technical Committee on Data Engineering, IEEE Data Eng. Bull. 23, No. 2, pp. 7-18.

Idreos, S, et. al, "Past and Future Steps for Adaptive Storage Data Systems: From Shallow to Deep Adaptivity," 2015, Real-Time Business Intelligence and Analytics, pp. 85-94, <https://nivdayan.github.io/birte2016.pdf>.

Picorel et al., "Near-Memory Address Translation," 26th International Conference on Parallel Architectures and Compilation Techniques (PACT), 2017, pp. 303-317.

R. Chen, Z. Qin, Y. Wang, D. Liu, Z. Shao and Y. Guan, "On-Demand Block-Level Address Mapping in Large-Scale NAND Flash Storage Systems," in IEEE Transactions on Computers, vol. 64, No. 6, pp. 1729-1741, Jun. 1, 2015.

Idreos, S, et. at, "Database Cracking," Jan. 2007, CIDR, vol. 7, pp. 68-78, <https://people.eecs.berkeley.edu/~kubitron/courses/cs262a/handouts/papers/cidr07p07.pdf>.

Lun, A.T.L. et al., "S2 Text: Optimizing Hdf5 Chunk Cache Parameters," Apr. 14, 2018, Research Gate, <https://www.researchgate.net/publication/325410777_S2_Text>, 3 pages.

Ranganathan, S., "Storage Class Memory: What's Next in Enterprise Storage," Sep. 4, 2018, NetApp Blog, <https://web.archive.org/web/20201001062038/https://blog.netapp.com/storage-class-memory-what-is-next-in-enterprise-storage/>, 13 pages.

Wei Zha, "Design Issues for SCM-friendly Data Structure," 2017, Flash Memory Summit 2017, <https://www.flashmemorysummit.com/English/Collaterals/Proceedings/2017/20170808_FN11_Zha.pdf>, 26 pages.

* cited by examiner

Machine Readable Medium
1400

1410

Receive a read request for a key-value pair in an index, where the index includes a plurality of indirect nodes in a plurality of levels, where each indirect node of the index comprises a buffer and a Bloom filter, and where sizes of the Bloom filters vary across the levels according to a predefined function

1420

Responsive to the read request for the key-value pair, determine whether the Bloom filter of an indirect node indicates that the buffer of the indirect node includes the key-value pair

1430

Responsive to a determination that the Bloom filter of the indirect node indicates that the buffer of the indirect node includes the key-value pair, search the buffer of the indirect node for the key-value pair

FIG. 14

KEY-VALUE INDEX WITH NODE BUFFERS

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system

BRIEF DESCRIPTION OF THE DRAWINGS

Some implementations are described with respect to the following figures.

FIG. 14 is a diagram of an example machine-readable medium storing instructions in accordance with some implementations.

Figure 1A:
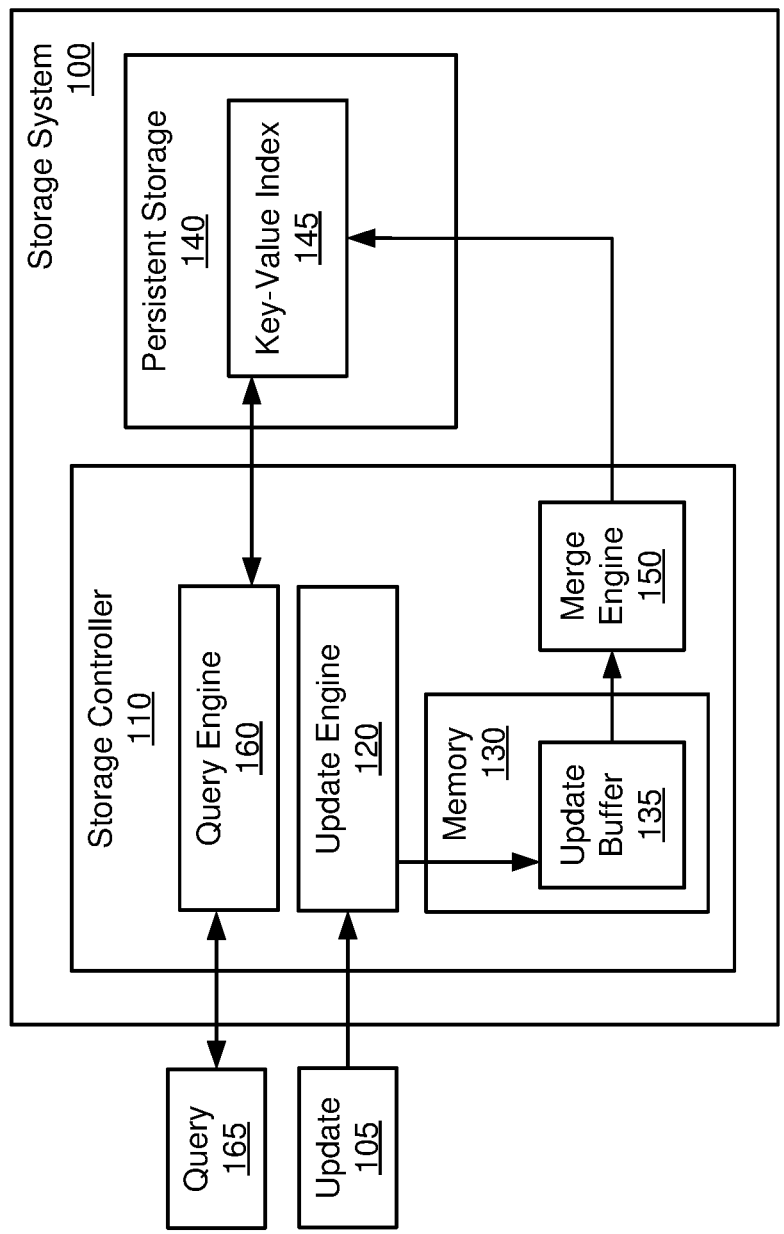
FIGS. 1A-1B are schematic diagrams of example systems, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, storage systems use indexes to indicate relationships or mappings between keys and values (also referred to herein as "key-value pairs"). One example use of a key-value index is a storage system that performs data deduplication based on "fingerprints" of incoming data units, where each fingerprint identifies a particular unit of data. A fingerprint of an incoming data unit is compared to a fingerprint index, which may be a key-value index in which fingerprints are the keys and the corresponding data locations are the values. A match between the fingerprint and a fingerprint stored in the fingerprint index indicates that the incoming data unit may be a duplicate of a data unit already stored in the storage system. If the incoming data unit is a duplicate of an already stored data unit, instead of storing the duplicative incoming data unit, a reference count stored in the storage system can be incremented to indicate the number of instances of the data unit that have been received.

A "fingerprint" refers to a value derived by applying a function on the content of the data unit (where the "content" can include the entirety or a subset of the content of the data unit). An example of the function that can be applied includes a hash function that produces a hash value based on the incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a key-value index can be in the form of a B-tree index including nodes arranged in a hierarchical manner. Leaf nodes of the B-tree index include entries that map keys to values. For example, in a deduplication system, the leaf nodes of the B-tree index map fingerprints to storage location indicators (e.g., a sequential block number). Internal nodes of the B-tree index may be used to find a matching entry of the B-tree index based on a key. However, using a B-tree index may be associated with various issues. For example, updating a B-tree index to include a new key-value pair may involve loading an entire leaf node of the B-tree index from persistent storage into memory, processing the leaf node to insert the new key-value pair, and re-writing the entire leaf node to persistent storage. Further, such updating may also involve similar loading, processing, and re-writing of multiple internal nodes to reflect the location of the new key-value pair. As such, each index update may consume a significant amount of memory, CPU, and disk bandwidth overhead associated with input/output operations of persistent storage. The amount of overhead associated with index updates may be referred to herein as "write amplification."

In accordance with some implementations of the present disclosure, rather than store a key-value index in a B-tree, a key-value index may be stored as a tree structure in which each internal node (referred to as an "indirect" node herein) can include a buffer to store key-value pairs (also referred to as a "node buffer"). The buffer of an indirect node continues to store the key-value pairs until a threshold level for the buffer is reached, which may cause all of the stored key-value pairs to be bulk transferred to child nodes (i.e., in a single transfer operation). In some examples, the bulk transfer of key-value pairs from a source node to child nodes (e.g., other indirect nodes or leaf nodes) may reduce the number of transfer and update operations between memory and persistent storage, and may thus reduce write amplification associated with the key-value index.

However, reading key-value pair data from the key-value index may involve loading the buffer of each node into memory and searching for the key in the buffer loaded in memory. As such, reading data of each key-value pair may also consume a significant amount of memory and bandwidth (referred to herein as "read amplification"). In accordance with some implementations of the present disclosure, each node of a key-value index may include a Bloom filter and fence pointers. In some examples, a buffer of a node is searched for a particular key if the Bloom filter of the node indicates that the particular key is stored in the buffer. In this manner, the Bloom filter may be used to avoid loading the buffer into memory, and may thereby reduce read amplification associated with reading the key-value pair.

In accordance with some implementations of the present disclosure, the buffer of a node may be divided into segments or "buffer chunks." Further, in some examples, each fence pointer of the node may indicate the lower bound of key values included in a corresponding buffer chunk. In other examples, the fence pointer may indicate the upper bound of key values included in the corresponding buffer chunk. When the Bloom filter indicates that the key-value pair is stored in the buffer, the fence pointers may be used to identify a particular buffer chunk that is likely to store the key-value pair. Instead of loading the entire buffer into memory, only the identified buffer chunk is loaded into memory. In this manner, using the fence pointers can reduce read amplification.

In accordance with some implementations of the present disclosure, the node buffers of the index may be sized according to the corresponding level in the index. In some examples, the ratio of the total buffer size in a given level to the total buffer size at the next lower level (i.e., one level closer to the leaf nodes) is set to a predefined value. The value of this ratio may be set by a user to tune the level of write amplification associated with the index.

In accordance with some implementations of the present disclosure, the Bloom filters at various levels of the index may be sized such that the Bloom filters in the nodes at higher levels (i.e., nearer to the root node) are associated with relatively lower false positive ratios than those at lower levels (i.e., nearer to the leaf nodes). In this manner, the memory use associated with Bloom filters may be optimized.

In accordance with some implementations of the present disclosure, the compaction of each indirect node can be run as a background process, while allowing additional entries to be added to the buffer even after the compaction is triggered by the buffer level (i.e., the amount of data stored in the buffer) reaching the threshold level of the buffer. The priority of the background process can be increased multiple times as the buffer level rises above the threshold. In this manner, updates to the index can continue without interrupting use of the node.

In accordance with some implementations of the present disclosure, in response to detecting a load of multiple sequential key-value pairs into the index, the operation of the index may be temporarily changed to behave as a B-tree during the processing of the sequential load. This temporary change may provide more efficient operation during sequential loads.

1. Storage System Including Key-Value Index with Node Buffers

FIG. 1A shows an example of a storage system 100 that includes a storage controller 110 and persistent storage 140, in accordance with some implementations. As shown, the storage controller 110 may include an update engine 120, a merge engine 150, memory 130, and a query engine 160. In some examples, the memory 130 may include an update buffer 135, and the persistent storage 140 may include a key-value index 145. In some implementations, the key-value index 145 may include key-value data that is organized as a node tree. An example implementation of the key-value index 145 is described below with reference to FIG. 2. In some examples, the persistent storage 140 may include one or more non-transitory storage media such as hard disk drives (HDDs), solid state drives (SSDs), optical disks, and so forth, or a combination thereof. The memory 130 may include semiconductor memory devices such as dynamic or static random access memories (DRAMs or SRAMs), non-volatile dual in-line memory modules (NVDIMM), and so forth.

In some implementations, the update engine 120 may receive an update 105 for the key-value index 145 in the persistent storage 140. For example, each update 105 may be a key-value pair to be added to the key-value index 145. In some examples, the update engine 120 may store all or a part of the update 105 in an update buffer 135 stored in memory 130. Further, the merge engine 150 may update the key-value index 145 with key-value pairs stored in the update buffer 135. Note that, although just one update buffer 135 is shown in FIG. 1, in other examples, the storage controller 110 can include multiple update buffers 135. In some examples, the memory 130 may be implemented in one or more volatile storage devices.

In some implementations, the query engine 160 may receive a query 165 specifying a given key, and may access or interact with the key-value index 145 (and the update buffer 135 in some examples) to determine the value matching the key specified in the query 165. Further, the query engine 160 may return the matching value in response to the query 165. In some examples, the query 165 may be a user-created query (e.g., a SQL query, a read request for a data element, etc.).

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software instructions and/or firmware instructions stored on at least one machine-readable storage medium) executable on the hardware processing circuit.

Figure 1B:
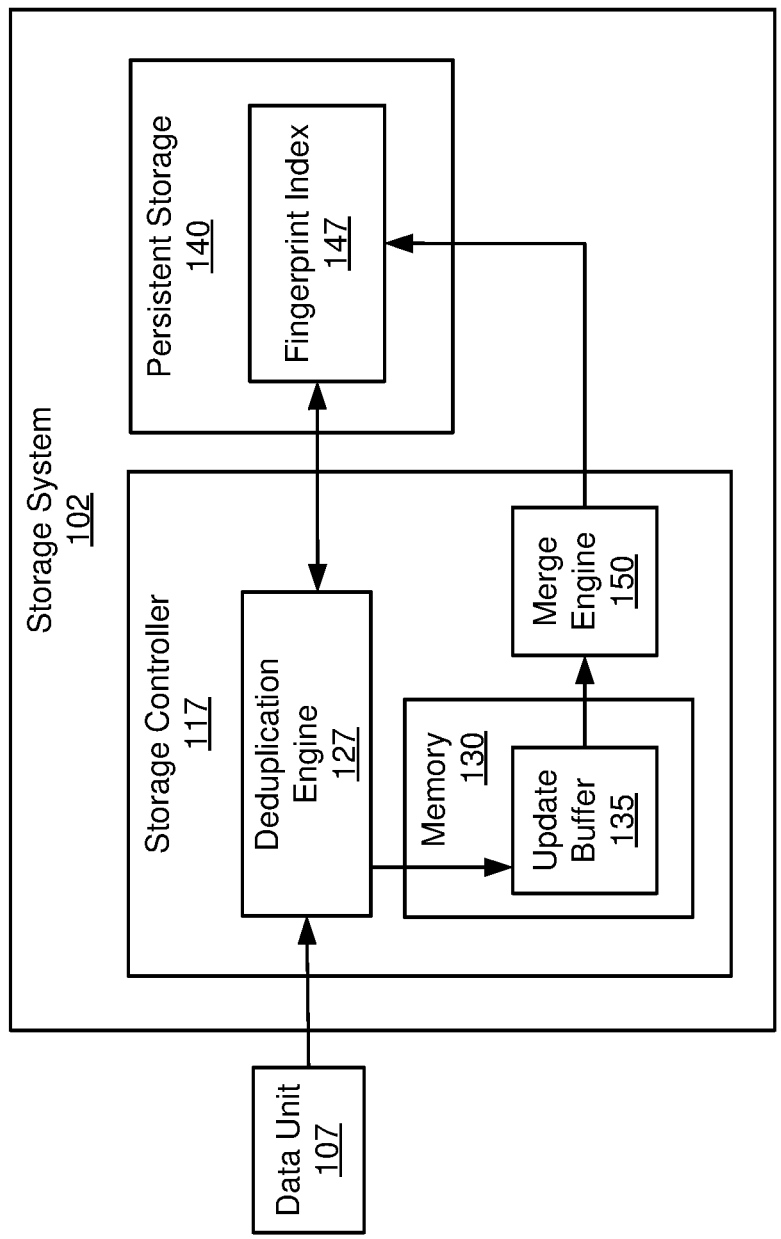

Referring now to FIG. 1B, shown is an example storage system 102 that is used for data deduplication. The elements of storage system 102 that have the same reference numbers of the storage system 100 (shown in FIG. 1A) designate similar, but not necessarily identical, elements. As shown, in the storage system 102, the storage controller 117 may include a deduplication engine 127, and the persistent storage 140 may include a fingerprint index 147. The fingerprint index 147 may correspond generally to an example implementation of the persistent index 145 (shown in FIG. 1A). Further, the data unit 107 may be an incoming data unit associated with write requests for writing data to the storage system 102. In some examples, a fingerprint index update (or equivalently, a "fingerprint index entry") for the data unit 107 may include a fingerprint and/or a corresponding storage location indicator for the data unit 107. In such examples, the fingerprint index 147 may store multiple fingerprints and corresponding location data.

In some implementations, the deduplication engine 127 may generate a fingerprint based on the data unit 107. In some examples, a fingerprint produced by the deduplication engine 127 can include a full or partial hash value based on the data unit 107. In other examples, the deduplication engine 127 may generate another type of fingerprint.

In some implementations, the deduplication engine 127 may determine, based on the fingerprint index 147, whether or not the storage system 102 actually contains a duplicate of the incoming data unit 107. More specifically, the deduplication engine 127 may compare the fingerprint generated for the data unit 107 to stored fingerprints in the fingerprint index 147. If the generated fingerprint matches a stored fingerprint, then the deduplication engine 127 can make a determination that a duplicate of the incoming data unit 107 is already stored by the storage system 102. As a result, the deduplication engine 127 can decide to not store the incoming data unit 107, and instead can update a count of the number of data units that share the matching fingerprint. On the other hand, if the fingerprint computed for the incoming data unit 107 does not match any fingerprint in the fingerprint index 147, then the deduplication engine 127 may determine that the storage system 100 does not store a duplicate of the data unit 107, and in response may newly store the data unit 107 in the storage system 102.

2. Example Key-Value Index Using Node Buffers

Figure 2:
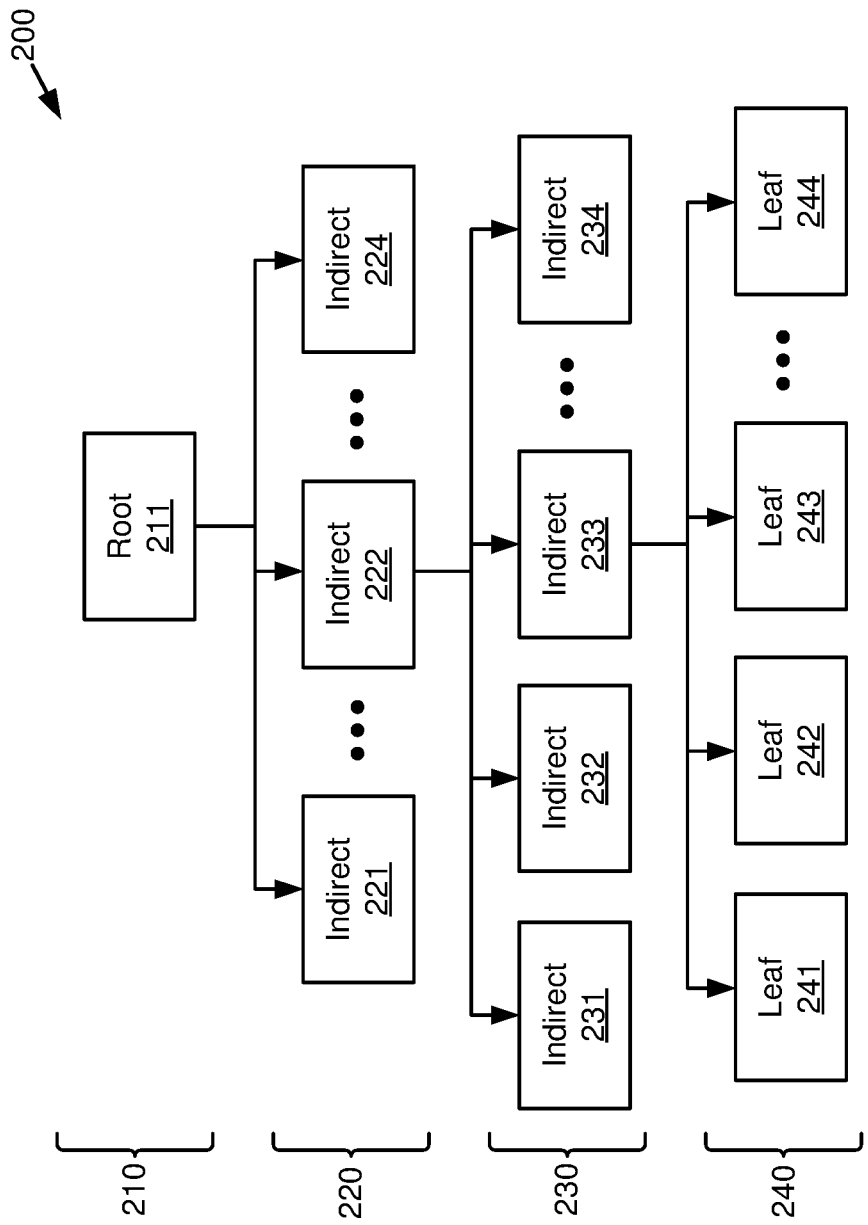
FIG. 2 is an illustration of an example key-value index, in accordance with some implementations.

FIG. 2 shows an illustration of an example key-value index 200, in accordance with some implementations. In some examples, the key-value index 200 may correspond generally to an example implementation of the key-value index 145 (shown in FIG. 1A) and/or the fingerprint index 147 (shown in FIG. 1B). Further, in some examples, the key-value index 200 may be generated by the storage controller 110 (shown in FIG. 1A) and/or the storage controller 117 (shown in FIG. 1B). In some examples, the key-value index 200 may map fingerprints of data units to locations of those data units. In other examples, the key-value index 200 may be a block index that maps a volume or offset to a combination of a generation identifier (e.g., a version number of a snapshot of the volume) and a storage location identifier (e.g., sequential block number). In still other examples, the key-value index 200 may be a disk index that maps different types of blocks to their disk locations (e.g., mapping storage location identifier to disk location of the block, mapping a combination of generation identifier and offset to disk location, and so forth), along with other information (e.g., a full fingerprint, a compressed size of the block, etc.). In yet another example, the key-value index 200 may be a cache index that maps a combination of a generation identifier and a user defined value to a combination of a block location of block and a compressed size. Other combinations of the above or variations thereof are also possible.

As shown in FIG. 2, the key-value index 200 may be arranged in a tree structure including multiple nodes. The nodes may be organized in various levels that form parent-child relationships. For example, a first level 210 may include a root node 211, and a second level 220 may include indirect nodes 221-224 that are children of the root node 211. Further, a third level 230 may include indirect nodes 231-234 that are children of indirect node 222 (in second level 220), and a fourth level 240 may include leaf nodes 241-244 that are children of indirect node 233 (in third level 230). In some examples, the number of child nodes that are related to each parent node may be specified by a fan-out parameter associated with the key-value index 200.

In examples herein, each node of a key-value index may be either a leaf node or an indirect node (i.e., any node other than a leaf node, including the root node). In some implementations, each indirect node of the key-value index 200 (e.g., root node 211, indirect nodes 221-224, indirect nodes 231-234) may include a buffer (also referred to herein as a "node buffer," and not shown in FIG. 2) to store key-value data. In some examples, each leaf node of the key-value index 200 may store key-value data. An example implementation of an indirect node including a node buffer is described below with reference to FIG. 3A.

In some implementations, the nodes of the key-value index 200 may be generated in stepwise fashion from the top to the bottom of the tree structure. For example, upon initializing the key-value index 200 (e.g., at time of first use), the key-value index 200 may only include the root node 211. In this example, the key-value pairs added to the key-value index 200 may be stored in a node buffer of root node 211.

In some implementations, when the key-value data stored in the node buffer of root node 211 reaches a threshold level (e.g., a particular number of stored key-value pairs, a particular percentage of the total capacity, and so forth), a compaction process may be triggered. As used herein, "compaction" may refer to transferring key-value data from a parent node to one or more child nodes. In some examples, the first time that root node 211 is compacted, the indirect nodes 221-224 (i.e., the immediate children of the root node 211) may be generated. Further, each time that root node 211 is compacted, the key-value data stored in the node buffer of root node 211 may be transferred to the node buffers of indirect nodes 221-224. As used herein, "transferring" data refers to moving the data to a destination node, such that the data is no longer present in a source node. In some examples, each of the indirect nodes 221-224 may be associated with a different portion of the range of keys in the node buffer of root node 211. Accordingly, in such examples, each of the key-value pairs of root node 211 may be distributed to a different one of the child nodes 221-224 according to the range associated with each child node. Once the compaction of root node 211 is completed, the node buffer of root node 211 is empty, and thereafter any new key-value updates that are received at the root node 211 will be stored in the node buffer of root node 211.

In some implementations, the compaction process described above may be similarly repeated for each indirect node. For example, the first time that indirect node 222 is compacted (i.e., when the node buffer of indirect node 222 reaches a threshold), the indirect nodes 231-234 (i.e., the immediate children of the indirect node 222) may be generated, and the key-value data stored in the node buffer of indirect node 222 may be transferred to the node buffers of indirect nodes 231-234. In another example, the first time that indirect node 233 is compacted, the leaf nodes 241-244 (i.e., the immediate children of the indirect node 233) may be generated, and the key-value data stored in the node buffer of indirect node 233 may be transferred to the leaf nodes 241-244.

In some implementations, the key-value index 200 may store each key and corresponding value as two separate stored elements. However, implementations are not limited in this regard. For example, in some implementations, the key may be implied or indicated by the offset or location of the corresponding value within a node or storage element. In such implementations, a "key-value pair" may refer to a stored value associated with an implicit key.

Note that, although not shown in FIG. 2 for the sake of clarity, other indirect nodes could have child nodes in various levels of the key-value index 200. For example, indirect node 221 could have multiple child nodes in the third level 230, indirect node 234 could have multiple child nodes in the fourth level 240, and the like throughout the key-value index 200 over time.

3. Example Nodes of Key-Value Index

Figure 3A:
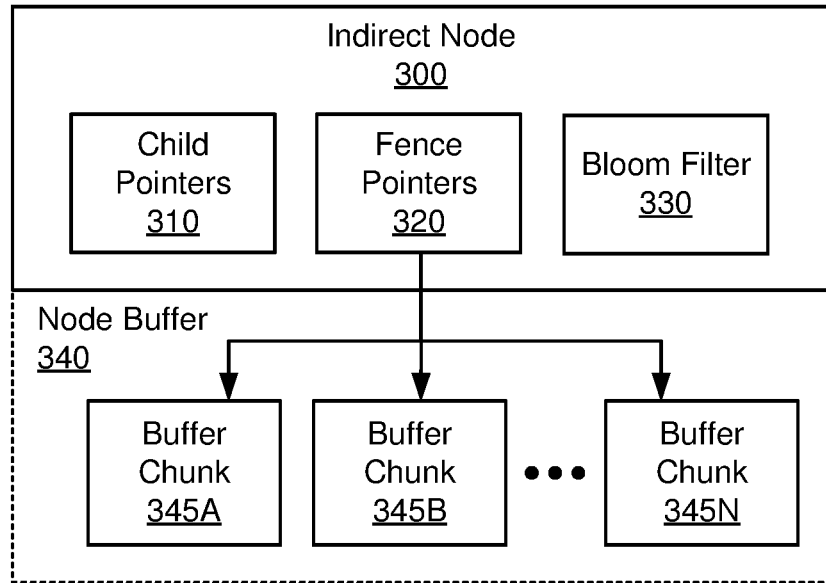
FIGS. 3A-3B are illustrations of example nodes of a key-value index, in accordance with some implementations.

FIG. 3A shows an illustration of an example indirect node 300, in accordance with some implementations. The indirect node 300 may correspond generally to an example implementation of any of the indirect nodes shown in FIG. 2 (e.g., root node 211, indirect nodes 221-224, and/or indirect nodes 231-234). As shown in FIG. 3A, the indirect node 300 may include some or all of child pointers 310, fence pointers 320, a Bloom filter 330, and/or a node buffer 340.

In some implementations, the node buffer 340 may include multiple buffer chunks 345A-345N (also referred to herein as "buffer chunks 345") to store key-value data (e.g., a fingerprint of a data unit and corresponding storage location indicator for that data unit 107). The buffer chunks 345A-345N may be arranged in order according to the keys (e.g., in numerical order, in alphabetical order, and so forth). For example, buffer chunk 345A may store key-value data for a lowest range of keys, while buffer chunk 345N may store key-value data for a highest range of keys. In some examples, each of the buffer chunks 345 may be of equal or similar size (e.g., 32 kb, 64 kb, etc.). In some implementations, the sizing of the node buffer 340 may be determined based on a level ratio. In some examples, the level ratio may be a fixed ratio between total buffer sizes in two adjacent levels of a key-value index. Further, the level ratio may be determined based on user-specified parameter(s) to tune the level of write amplification associated with the key-value index.

In some implementations, the child pointers 310 may point to or otherwise identify any nodes that are immediate children of the indirect node 300. For example, referring to the key-value index 200 (shown in FIG. 2), the root node 211 may include respective child pointers 310 that point to each of the indirect nodes 221-224 (i.e., the immediate children of the root node 211). In some examples, the child pointers 310 may be generated the first time that the indirect node 300 is compacted (e.g., when the node buffer 340 reaches a predefined threshold level).

In some implementations, the Bloom filter 330 may allow determination of which keys are not included in the node buffer 340 and which keys may be included in the node buffer 340 (i.e., with a possibility of false positives). Stated differently, the Bloom filter 330 indicates the keys that are not included in the node buffer 340, and indicates the keys that might be included in the node buffer 340 with the possibility of providing a false positive indication for at least some keys (i.e., indicating that a key is included in the node buffer 340 when it is not). Accordingly, if the Bloom filter 330 indicates that a particular key is not included in the node buffer 340, it is possible to avoid processing time and/or bandwidth associated with loading that node buffer 340 into memory and searching for that particular key, since use of the Bloom filter 330 may accurately indicate when the key is not included in the node buffer 340. In contrast, if the Bloom filter 330 indicates that a particular key is included in the node buffer 340, the node buffer 340 can then be searched for that particular key. In some implementations, the sizing of Bloom filter 330 may be sized such that the Bloom filters 330 in nodes at higher levels are relatively larger than those at lower levels.

In some implementations, when searching the node buffer 340 for a particular key, the fence pointers 320 may be used to identify a particular buffer chunk 345 that is likely to store data associated with the particular key. In some examples, the fence pointers 320 may identify the lowest and/or highest key values of each buffer chunk 345. For example, each fence pointer 320 may identify the lower bound of key values included in a corresponding buffer chunk 345. Therefore, the fence pointers 320 may be used to identify which buffer chunk 345 includes the key range that the searched key falls into. Accordingly, instead of loading the entire node buffer 340 into memory, only the identified buffer chunk 345 needs to be loaded into memory. In this manner, the fence pointers 320 may reduce read amplification associated with the indirect node 300.

In some implementations, the buffer chunks 345 may be stored together or in separate data blocks. Further, the buffer chunks 345 may be stored separately from the remaining elements of the indirect node 300 (i.e., child pointers 310, fence pointers 320, and/or Bloom filter 330). In some examples, the child pointers 310, fence pointers 320, and the Bloom filter 330 may be loaded into memory prior to loading any of the buffer chunks 345 into memory. Further, if the Bloom filter 330 indicates that a searched key is included in the node buffer 340, the fence pointers 320 may be used to identify a single buffer chunk 345, and only that identified buffer chunk 345 is then loaded into memory.

Figure 3B:
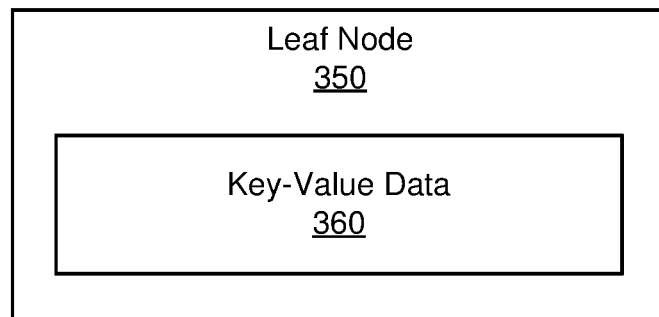

FIG. 3B shows an illustration of an example leaf node 350, in accordance with some implementations. The leaf node 350 may correspond generally to an example implementation of any of the leaf nodes shown in FIG. 2 (e.g., leaf nodes 241-244). As shown in FIG. 3B, the leaf node 350 may include key-value data 360.

4. Compaction Process in Key-Value Index

Figure 4:
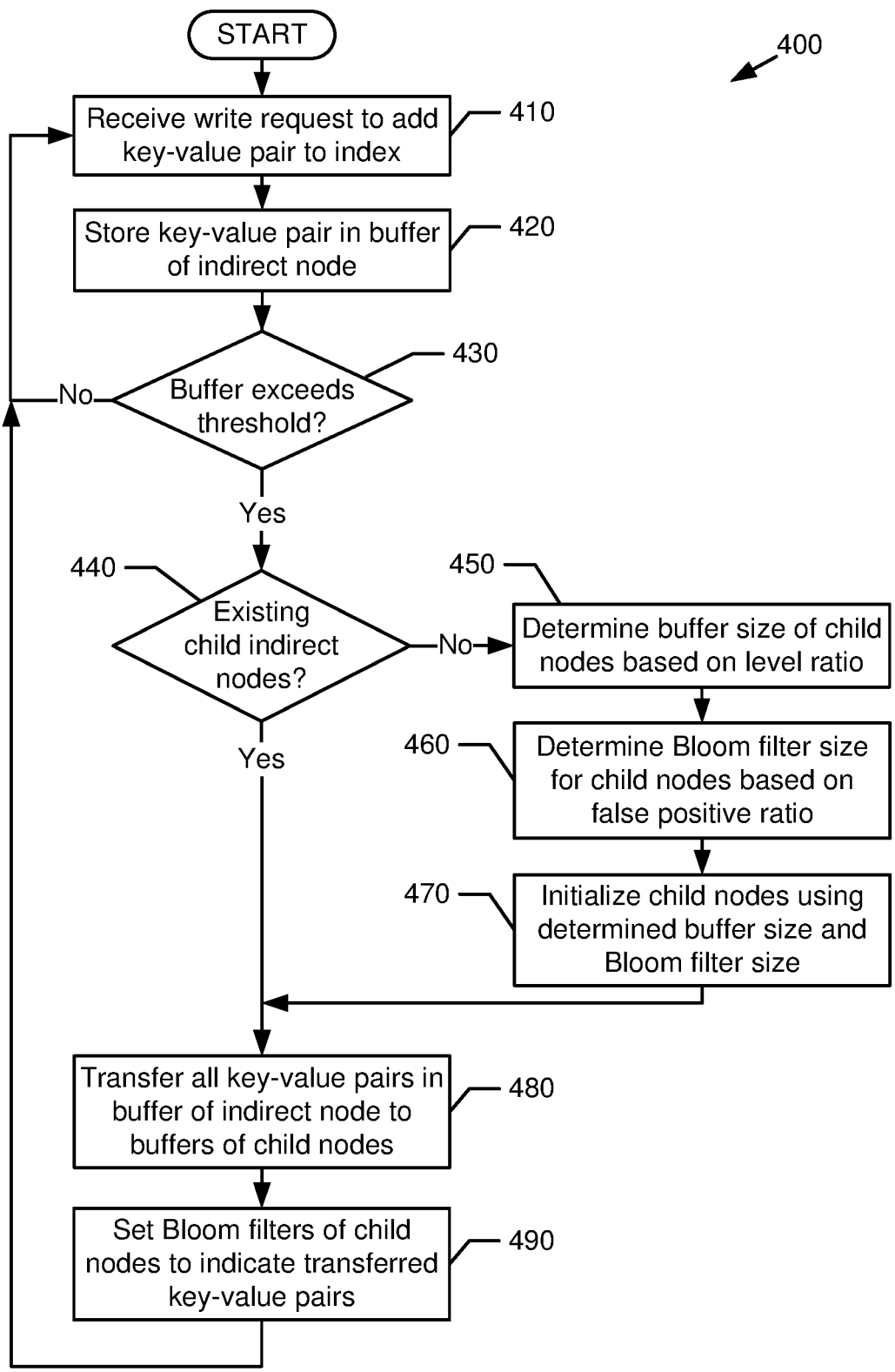
FIG. 4 is an illustration of an example process, in accordance with some implementations.

FIG. 4 shows an example process 400, in accordance with some implementations. In some examples, the process 400 may be performed using some or all of the storage controller 110 (shown in FIG. 1A) or storage controller 117 (shown in FIG. 1B). The process 400 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 400 may be described below with reference to FIGS. 1A-3B, which show examples in accordance with some implementations. However, other implementations are also possible.

Block 410 may include receiving a write request to add a key-value pair to an index. For example, referring to FIG. 1A, the update engine 120 may store the update 105 in the update buffer 135, and the merge engine 150 may update the key-value index 145 with key-value pair data stored in the update buffer 135. In some examples, the key-value index 145 may be arranged in a tree structure including multiple nodes. Further, in some examples, the key-value index 145 may map fingerprints of data units to locations of those data units.

Block 420 may include storing the key-value pair in a node buffer of an indirect node of the index. Assume that, in the example of FIG. 4, the indirect node is more than one level above any leaf nodes. Stated differently, in the example of FIG. 4, any child nodes of the indirect node that stores the key-value pair (at block 420) are also indirect nodes. For example, referring to FIGS. 1A-3A, the storage controller 110 and/or the merge engine 150 may store the received key-value pair in the node buffer 340 of the root node 211. In some examples, a Bloom filter 330 of the root node 211 may be configured (e.g., by setting bit values) to indicate that the received key-value pair is stored in the node buffer 340 of the root node 211.

Diamond 430 may include determining whether the node buffer of the indirect node exceeds a predefined threshold. If it is determined that the node buffer does not exceed the threshold, then the process 400 may return to block 410 (i.e., to receive another key-value pair). For example, referring to FIGS. 1A-3A, the storage controller 110 may determine whether the node buffer 340 of root node 211 exceeds a predefined fill level (e.g., 90% full, 100% full, a given number of key-value pairs, and so forth).

However, if it is determined at diamond 430 that the node buffer exceeds the threshold, then the process 400 may continue at diamond 440, which may include determining whether the indirect node has any existing child indirect nodes. For example, referring to FIGS. 1A-3A, the storage controller 110 may determine that the node buffer 340 of the root node 211 has been filled to a predefined level, and in response may determine whether the root node 211 has any immediate child nodes (i.e., any child nodes that are one level below the root node 211). Note that, as shown in FIG. 2, the immediate child nodes of root node 211 are indirect nodes and not leaf nodes.

If it is determined at diamond 440 that the indirect node does not have any existing child indirect nodes, then the process 400 may continue at block 450, which may include determining a buffer size for child indirect nodes based on a level ratio. Block 460 may include determining a Bloom filter size for child indirect nodes. For example, referring to FIGS. 1A-3A, the storage controller 110 may determine that root node 211 does not have any child nodes, and in response may use a level ratio to determine a buffer size for child nodes of the root node 211. In some examples, the level ratio may be a computed ratio between total buffer sizes in two adjacent levels of the key-value index 200. Therefore, in such examples, the total buffer sizes of indirect nodes 221-224 may be different from the size of the node buffer of root node 211. Further, the node buffer of each of indirect nodes 221-224 may be different (e.g., smaller or larger) that the node buffer of root node 211. Further, the storage controller 110 may determine a Bloom filter size for child nodes of the root node 211. In some examples, the Bloom filter size may be determined based on false positive ratios associated with different levels of the key-value index 200.

Block 470 may include initializing a set of child nodes using the determined buffer size and Bloom filter size. For example, referring to FIGS. 1A-3A, the storage controller 110 may initialize indirect nodes 221-224 as immediate children of the root node 211. Further, each of the child nodes 221-224 may include a node buffer 340 of a particular buffer size (determined at block 450) and a Bloom filter 330 of a particular Bloom filter size (determined at block 460).

After block 470, or if it is determined at diamond 440 that the indirect node has existing child nodes, then the process 400 may continue at block 480, which may include transferring all key-value pairs from the node buffer of the indirect node to the node buffers of the child nodes (initialized at block 470). For example, referring to FIGS. 1A-3A, the storage controller 110 may transfer all key-value pairs from the node buffer of the root node 211 to the node buffers of the child nodes 221-224. In some examples, each of the transferred key-value pairs is distributed to one of the child nodes 221-224 based on different key ranges associated with the child nodes 221-224.

Block 490 may include setting the Bloom filters of the child nodes to indicate the transferred key-value pairs. For example, referring to FIGS. 1A-3A, the storage controller 110 may set the Bloom filter 330 of child node 221 to indicate the key-value pairs that were transferred from root node 211 to child node 221. The storage controller 110 may similarly set the Bloom filters 330 of the remaining child nodes 222-224. After block 490, the process 400 may return to block 410 (i.e., to continue receiving write requests to add key-value pairs to the index). Note that process 400 may be similarly repeated for different indirect nodes of the key-value index 200 (e.g., for each of indirect nodes 221-224, 231-234), and may also be repeated at the same indirect node (e.g., for multiple compactions).

In some examples, the process 400 may allow generating child indirect nodes with variable sizing of node buffers and Bloom filters. In this manner, the process 400 may allow tuning of write amplification associated with use of the index, as well as optimization of memory use associated with Bloom filters. Note that, as discussed above, the indirect node that stores the key-value pair in block 410 is more than one level above any leaf nodes. Stated differently, in the case of an indirect node that has immediate children that are leaf nodes, the actions of blocks 450-490 (e.g., determining a node buffer size, determining a Bloom filter, initializing a node buffer and a Bloom filter, and so forth) are not performed for the child leaf nodes.

5. Read Process Using Bloom Filter

Figure 5:
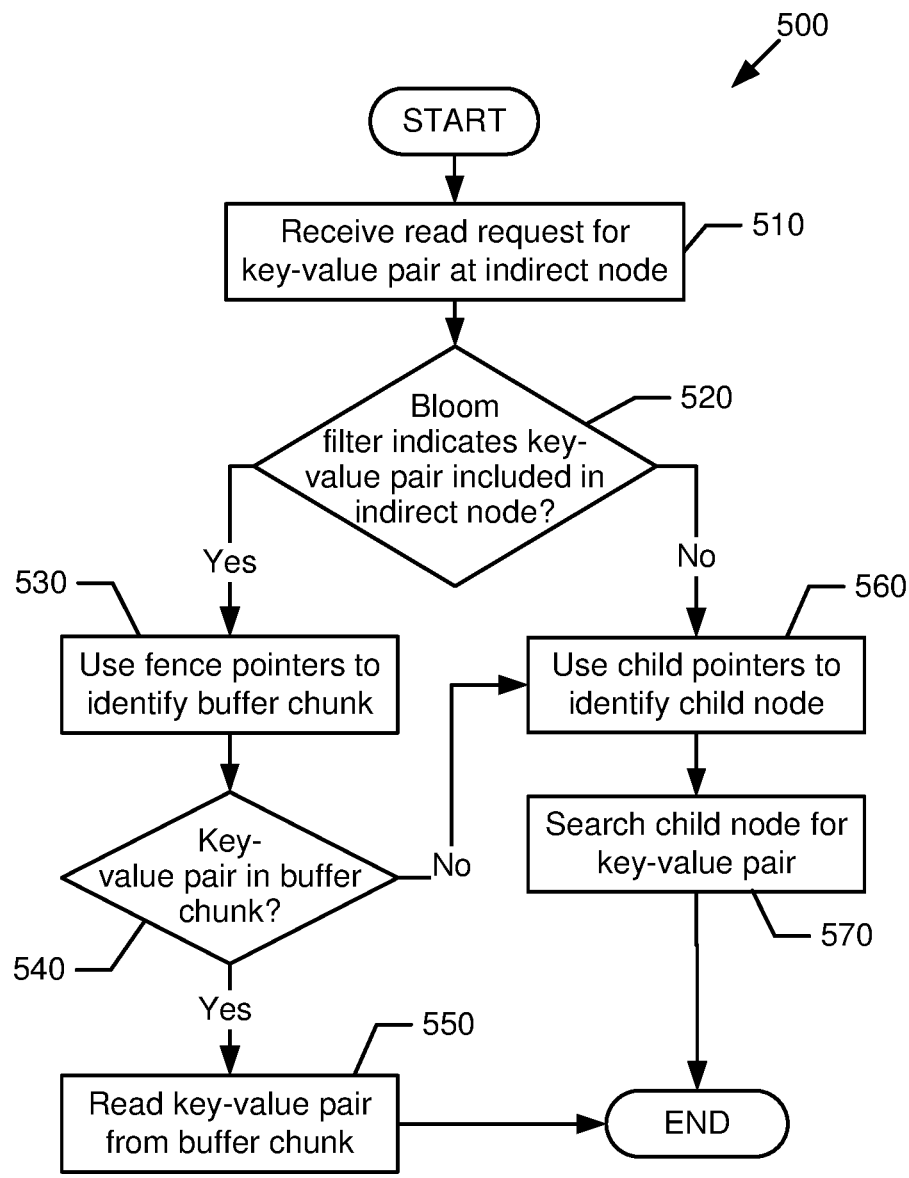
FIG. 5 is an illustration of an example process, in accordance with some implementations.

FIG. 5 shows an example process 500, in accordance with some implementations. In some examples, the process 500 may be performed using some or all of the storage controller 110 (shown in FIG. 1A) or storage controller 117 (shown in FIG. 1B). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 500 may be described below with reference to FIGS. 1A-3B, which show examples in accordance with some implementations. However, other implementations are also possible.

Block 510 may include receiving a read request for a key-value pair at an indirect node of a key-value index. For example, referring to FIGS. 1A-2, the query engine 160 may receive a query 165 specifying a key. In response to the query 165, the query engine 160 may search for the key by analyzing or reading nodes of the key-value index 145 in a top-down pattern. Accordingly, the query engine 160 may begin searching for the key at the root node 211 (i.e., the highest-level node in the key-value index 200).

Diamond 520 may include determining whether a Bloom filter of the indirect node indicates that the key-value pair is included in a node buffer of the indirect node. For example, referring to FIGS. 1A-3A, the storage controller 110 may determine whether the Bloom filter 330 of the root node 211 indicates that the node buffer 340 of the root node 211 includes the key-value pair.

If it is determined at diamond 520 that the Bloom filter indicates that the key-value pair is not included in the node buffer of the indirect node, then the process 500 may continue at block 560 (described below). Otherwise, if it is determined at diamond 520 that the Bloom filter indicates that the key-value pair is included in the node buffer of the indirect node, then the process 500 may continue at block 530, which may include using fence pointers to identify a buffer chunk (i.e., a portion of a node buffer) of the indirect node.

Diamond 540 may include determining whether the key-value pair is included in the identified buffer chunk. For example, referring to FIGS. 1A-3A, the storage controller 110 may use the fence pointers 320 of the root node 211 to identify a buffer chunk 345 of the root node 211 that corresponds to the key-value pair (e.g., a buffer chunk having a key range that encompasses the desired key). The storage controller 110 may then load the identified buffer chunk 345 into memory, and may search the identified buffer chunk 345 for the key-value pair.

If it is determined at diamond 550 that the key-value pair is included in the identified buffer chunk, then the process 500 may continue at block 550, which may include reading the key-value pair from the identified buffer chunk. For example, referring to FIGS. 1A-3A, the storage controller 110 may read the value corresponding to a particular key from the node buffer 340 of the root node 211.

However, if it is determined at diamond 550 that the key-value pair is not included in the identified buffer chunk (i.e., the Bloom filter returned a "false positive" indication at diamond 520), then the process 500 may continue at block 560, which may include using child pointers of the indirect node to identify a child node (i.e., a node that is an immediate child of the indirect node). Block 570 may include searching the identified child node for the key-value pair. For example, referring to FIGS. 1A-3, in response to determining that the key is not stored in the node buffer 340 of the root node 211 (i.e., in the event of a false positive result from the Bloom filter 330 of root node 211), the storage controller 110 may use the child pointers 310 of the root node 211 to identify the indirect nodes 221-224 that are immediate children (i.e., one level down) of the root node 211. Further, in this example, the child pointers 310 may indicate that the key-value pair specified in the read request corresponds to the key range of the indirect node 222, and therefore the storage controller 110 may search the indirect node 222 for the key-value pair. The storage controller 110 may read the key-value pair if found in the indirect node 222. After either block 550 or block 570, the process 500 may be completed.

In some examples, the process 500 may use of a Bloom filter in each indirect node to avoid loading any buffer chunk of the node buffer into memory. In this manner, the process 500 may reduce read amplification associated with reading key-value pairs from an index. Note that the process 500 may be repeated and/or looped for different levels of a node tree. For example, if the child node identified at block 560 is an indirect node, performing block 570 (i.e., searching the child node for the key-value pair) may involve performing another iteration of process 500, including using a Bloom filter of the child node to determine if the key-value pair is included in the child node, using fence pointers of the child node to identify a buffer chunk of the child node, and so forth.

6. Process for Updates During Scheduled Compaction

Figure 6:
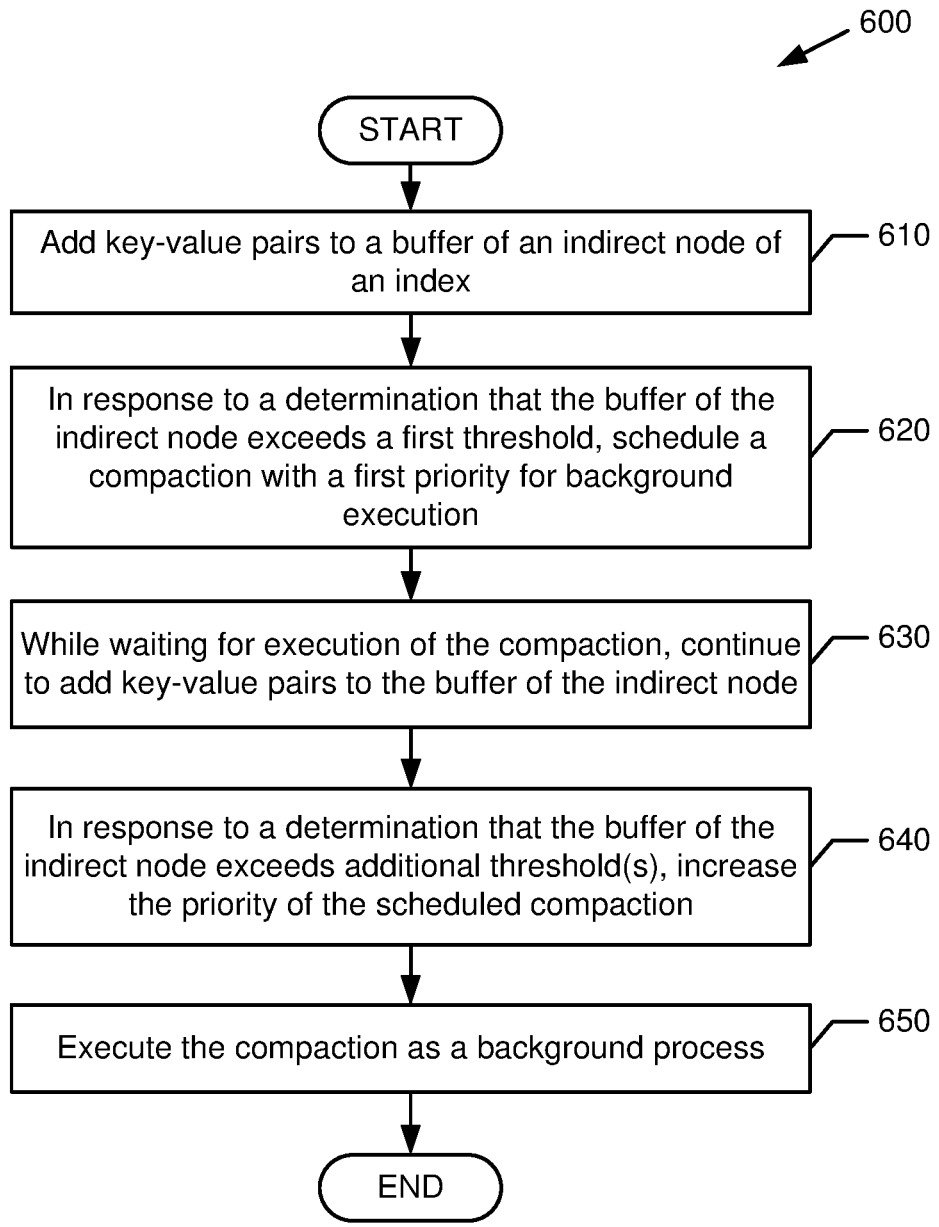
FIG. 6 is an illustration of an example process, in accordance with some implementations.

FIG. 6 shows an example process 600, in accordance with some implementations. In some examples, the process 600 may be performed using some or all of the storage controller 110 (shown in FIG. 1A) or storage controller 117 (shown in FIG. 1B). The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 600 may be described below with reference to FIGS. 1A-3B, which show examples in accordance with some implementations. However, other implementations are also possible.

Block 610 may include adding key-value pairs to a node buffer of an indirect node of an index. For example, referring to FIGS. 1A-3A, the storage controller 110 may add key-value pairs to the node buffer 340 of the root node 211.

Block 620 may include, in response to a determination that the node buffer of the indirect node exceeds a first threshold, scheduling a compaction of the indirect node with a first priority for background execution. For example, referring to FIGS. 1A-3A, the storage controller 110 may determine that the node buffer 340 of the root node 211 has been filled to a first threshold level (e.g., 90% full, a particular number of key-value pairs, a particular amount of memory used, and so forth). In response to this determination, the storage controller 110 may schedule a compaction of the root node 211. The scheduled compaction may be scheduled at a first priority (e.g., a relatively low priority) to execute as a background process (e.g., running without user interaction, and/or running only when processing bandwidth is not needed for higher priority tasks).

Block 630 may include, while waiting for execution of the compaction, continuing to add key-value pairs to the node buffer of the indirect node. For example, referring to FIGS. 1A-3A, the storage controller 110 may, while waiting for the scheduled compaction to execute, continue adding key-value pairs to the node buffer 340 of the root node 211. Accordingly, the node buffer 340 will be filled beyond the first threshold level.

Block 640 may include, in response to a determination that the node buffer of the indirect node exceeds additional threshold(s), increasing the priority of the scheduled compaction. Note that block 640 may include multiple priority increases corresponding to reaching multiple thresholds. For example, referring to FIGS. 1A-3A, while waiting for the scheduled compaction to execute, the storage controller 110 may determine that the node buffer 340 of the root node 211 has been filled to a second threshold level that is higher than the first threshold level, and in response may increase the priority of the scheduled compaction to a second priority that is higher than the first priority. Subsequently, the storage controller 110 may determine that the node buffer 340 has been filled to a third threshold level that is higher than the second threshold level, and in response may increase the priority of the scheduled compaction to a third priority that is higher than the second priority. The storage controller 110 may perform any number of priority adjustments based on the node buffer 340 reaching corresponding threshold levels.

Block 650 may include executing the compaction of the indirect node as a background process. For example, referring to FIGS. 1A-3A, the storage controller 110 may perform a compaction as a background process based on its current priority level (e.g., first priority level, second priority level, etc.). In some examples, block 650 may include some or all of the process 400 discussed above with reference to FIG. 4. After block 650, the process 600 may be completed.

In some examples, the process 600 may allow compaction of each indirect node to run as a background process, while allowing additional entries to a node buffer of the indirect node. In this manner, updates to a key-value index can continue without interrupting use of the indirect node.

7. Process for Sequential Write Loads

Figure 7:
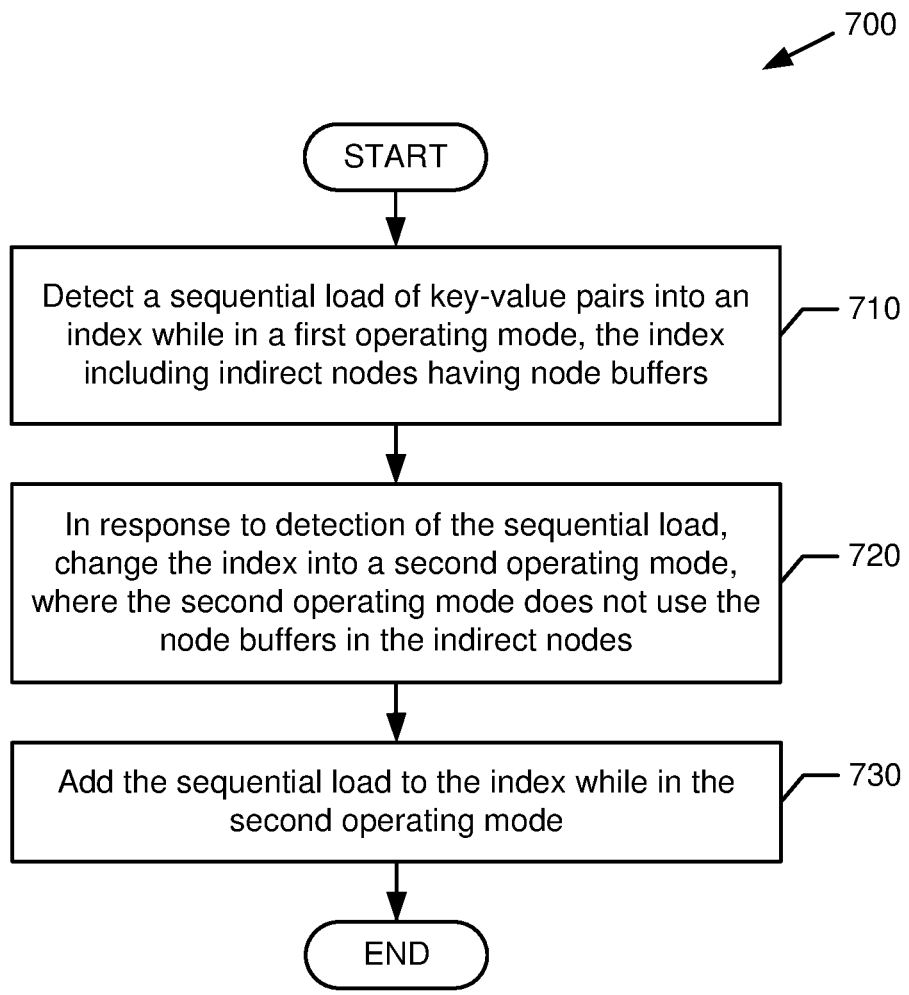
FIG. 7 is an illustration of an example process, in accordance with some implementations.

FIG. 7 shows an example process 700, in accordance with some implementations. In some examples, the process 700 may be performed using some or all of the storage controller 110 (shown in FIG. 1A) or storage controller 117 (shown in FIG. 1B). The process 700 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 700 may be described below with reference to FIGS. 1A-3B, which show examples in accordance with some implementations. However, other implementations are also possible.

Block 710 may include detecting a sequential load of key-value pairs into an index while in a first operating mode, the index including indirect nodes having node buffers. For example, referring to FIGS. 1A-3A, the storage controller 110 may detect a write of a sequential group of key-value pairs to the key-value index 200 being used in a first operating mode. The sequential group may include multiple key-value pairs in which the keys form a continuous sequence (e.g., 001, 002, 0003, and so forth). In some examples, the first operating mode of the key-value index 200 may correspond generally to some or all of the process 400 discussed above with reference to FIG. 4. For example, the first operating mode of the key-value index 200 may include storing key-value pairs in the node buffer of each indirect node, and transferring the stored key-value pairs to child nodes in response to a determination that the node buffer has reached a predefined threshold.

Block 720 may include, in response to detection of the sequential load, changing the index into a second operating mode, where the second operating mode does not use the node buffers in the indirect nodes. For example, referring to FIGS. 1A-3A, the storage controller 110 may, in response to detecting the addition of the sequential group of key-value pairs, change the key-value index 200 into a second operating mode that does not use the node buffers 340 in the indirect nodes 300. In some examples, the second operating mode of the key-value index 200 may correspond generally to the operation of a B-tree index, where the key-value mapping data is only stored in the leaf nodes, and the indirect nodes are only used to identify the leaf node that stores the mapping data for a particular key-value pair.

Block 730 may include adding the sequential load to the index while in the second operating mode. For example, referring to FIGS. 1A-3A, the storage controller 110 may add the sequential group to the key-value index 200 while under the second operating mode that does not use the node buffers 340 (e.g., according to a B-tree operation), such that each key-value pair in the sequential group is only stored in a leaf node of the index 200. In some examples, block 730 may include flushing any key-value pairs in node buffers of the indirect nodes that match or overlap the sequential load down to the corresponding leaf node(s). After block 730, the process 700 may be completed.

In some examples, the process 700 may allow an index to be temporarily changed to behave as a B-tree index during the handle a sequential load. Accordingly, the process 700 may provide improved efficiency during sequential loads of key-value pairs into an index.

8. Process for Determining Level Ratio

Figure 8:
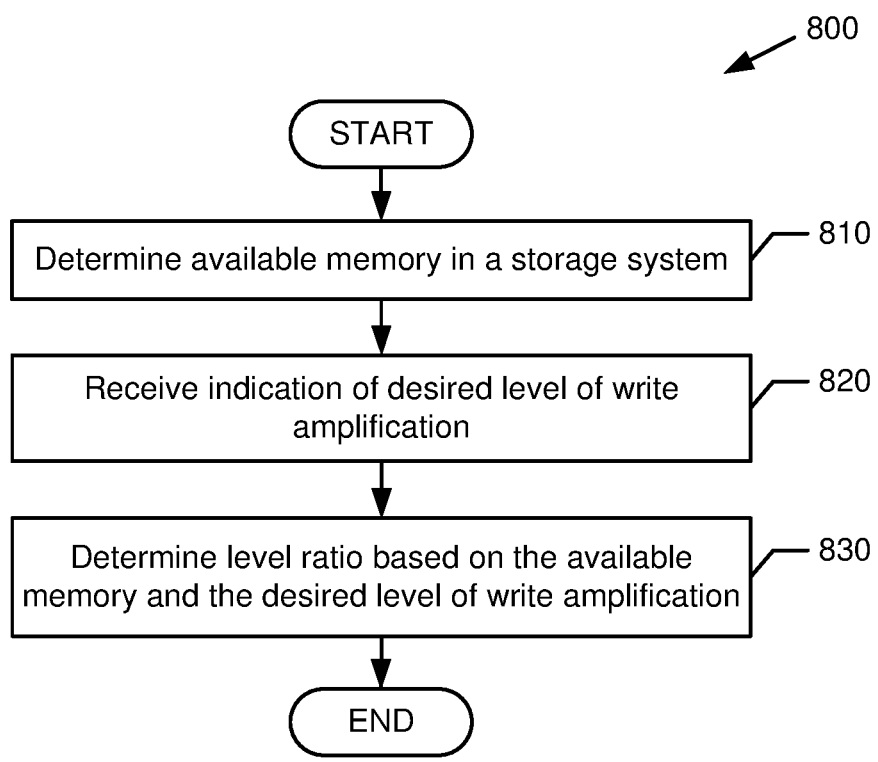
FIG. 8 is an illustration of an example process, in accordance with some implementations.

FIG. 8 shows an example process 800, in accordance with some implementations. In some examples, the process 800 may be performed using some or all of the storage controller 110 (shown in FIG. 1A) or storage controller 117 (shown in FIG. 1B). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 800 may be described below with reference to FIGS. 1A-3B, which show examples in accordance with some implementations. However, other implementations are also possible.

Block 810 may include determining the available memory in a storage system. For example, referring to FIG. 1A, the storage controller 110 may determine the amount of memory 130 that is available for updating the key-value index 145.

Block 820 may include receiving an indication of a desired level of write amplification. For example, referring to FIG. 1A, the storage controller 110 may receive a user input or command indicating a level of write amplification that is desired by (or is acceptable to) the user with respect to updating the key-value index 145.

Block 830 may include determining a level ratio based on the available memory and the desired level of write amplification. In some examples, the level ratio may be a fixed ratio between total buffer sizes in two adjacent levels of a key-value index. For example, referring to FIG. 2, assuming that the root node 211 in first level 210 has a buffer size of 10 MB and that the level ratio is 5, then the total size of the node buffers in the nodes of the second level 220 is 50 MB (i.e., ratio of 5=50 MB/10 MB). Further, the total size of the node buffers in the nodes of the third level 230 is 250 MB (i.e., ratio of 5=250 MB/50 MB). In some examples, the storage controller 110 may determine the level ratio using the following equation:

$$WAF = \frac{(r_0 + r_1 + \ldots + r_{L-1} + L + 2r_L)}{2} + 1$$

In the above equation, the term WAF is a write amplification level, L is the number of levels (i.e., depth) of the index, $r_0$ is the ratio of the buffer size at level 0 (i.e., at the root node) to the size of a single batch of user updates, $r_x$ (where x is greater than 0 and less than L) is the ratio of the total size (i.e., sum) of node buffers at level x to the total size of node buffers at level x−1, and $r_L$, is the ratio of the total size of leaf nodes (at the lowest level L) to the total size of node buffers at level L−1. In some examples, the write amplification factor may be proportional to the sum of the level ratios of all levels of the index. After block 830, the process 800 may be completed. In some examples, a write amplification level may be determined based on an amount of available memory, and the level ratio may then be determined using the write amplification level. Further, in other examples, the write amplification level may be received as an input parameter (e.g., as specified by a user or configuration setting), and may be used to determine the level ratio. In some examples, the level ratios may be different from different levels of the index. In some implementations, the above equation may be used to tune or adjust the write amplification level associated with the index by adjusting the level ratio(s) and/or memory allocated for the index. Further, the above equation may be modified or adjusted (e.g., to include additional or fewer parameters) based on the system configuration. Other variations and/or combinations are possible.

9. Process for Determining Bloom Filter Sizes

Figure 9:
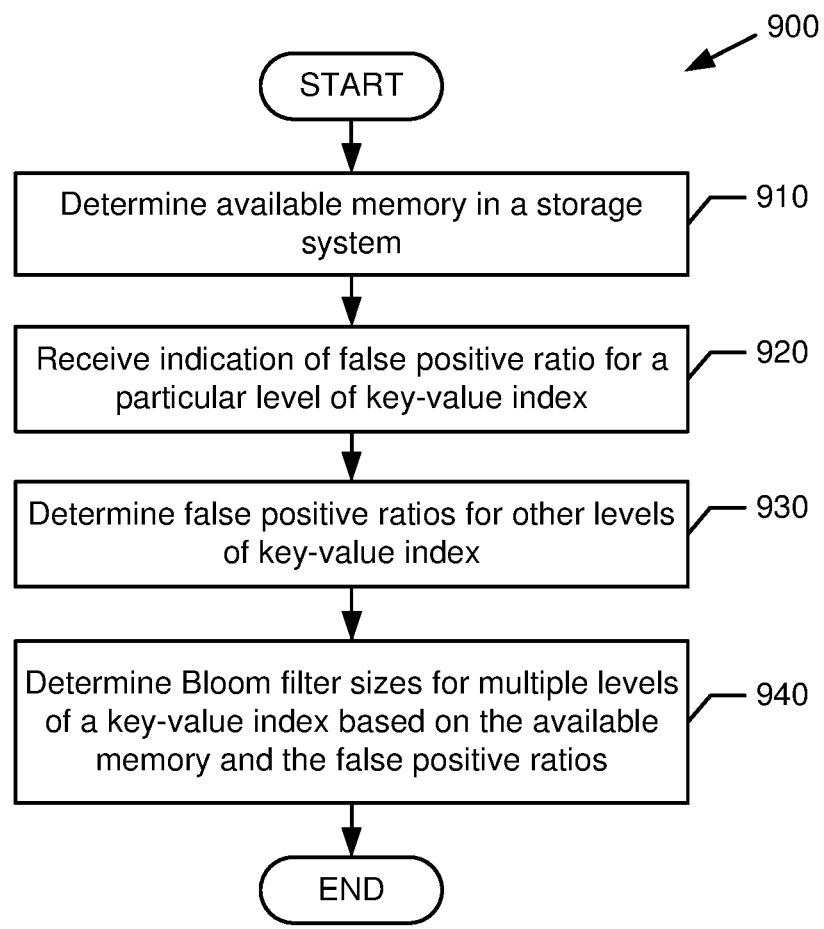
FIG. 9 is an illustration of an example process, in accordance with some implementations.

FIG. 9 shows an example process 900, in accordance with some implementations. In some examples, the process 900 may be performed using some or all of the storage controller 110 (shown in FIG. 1A) or storage controller 117 (shown in FIG. 1B). The process 900 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 900 may be described below with reference to FIGS. 1A-3B, which show examples in accordance with some implementations. However, other implementations are also possible.

Block 910 may include determining the available memory in a storage system. For example, referring to FIG. 1A, the storage controller 110 may determine the amount of memory 130 that is available for using the key-value index 145.

Block 920 may include receiving an indication of a false positive ratio for a particular level of a key-value index. For example, referring to FIG. 1A, the storage controller 110 may receive a user input or command indicating a false positive ratio (e.g., 2%, 5%, etc.) that is acceptable to the user with respect to reading the key-value index 145. In some examples, the received indication may specify false positive ratio(s) specific to particular level(s) of indirect nodes of the key-value index (e.g., for level 230 shown in FIG. 2).

Block 930 may include determining false positive ratios for other levels of the key-value index. In some implementations, the false positive ratios of an index may be determined so that higher levels of the index have relatively smaller false positive ratios than lower levels of the index. Further, the false positive ratios of a level may be calculated by multiplying the false positive ratio of another level by a constant value. For example, referring to FIGS. 1A-2, the storage controller 110 may determine the false positive ratio F+1 for the second-to-lowest level of indirect nodes (e.g., level 220 shown in FIG. 2) by multiplying the false positive ratio F of the lowest level of indirect nodes (e.g., level 230 shown in FIG. 2) by a constant value V (e.g., 0.5). Further, the storage controller 110 may determine the false positive ratio F+2 for the third-to-lowest level of indirect nodes (e.g., level 210 shown in FIG. 2) by multiplying the false positive ratio F+1 of the second-to-lowest level of indirect nodes (e.g., level 220 shown in FIG. 2) by the constant value V. This multiplication process may be repeated to calculate the false positive ratio for any number of levels in the key-value index.

Block 940 may include determining Bloom filter sizes for multiple levels of a key-value index based on the available memory and the false positive ratios of these levels. In some implementations, the size of each Bloom filter (e.g. the number of bits used in the Bloom filter) may increase in inverse relationship to the false positive ratio of the associated level in the index For example, the Bloom filter sizes may vary according to a predefined function based on the false positive ratio of the associated level (e.g., the Bloom filter size may be inversely proportional to the natural log of the false positive rate of that Bloom filter). For example, referring to FIGS. 1A-2, the storage controller 110 may allocate the available memory among the various Bloom filters in the key-value index according to the false positive ratios of each node level (determined at block 930). In this example, the higher levels of the index may be determined to have relatively smaller false positive ratios, and therefore the Bloom filter in each individual internal node at a higher level is allocated a larger amount of memory per key-value pair (e.g., number of bits) than the Bloom filter in each individual internal node at a lower level. After block 940, the process 900 may be completed.

In some implementations, determining the Bloom filter sizes may be performed using the following equation:

$$M_{BF} = 1.44 \cdot (-\log_2 e) \cdot C \cdot \left( \frac{1}{r_L} + \frac{1}{r_L r_{L-1}} + \ldots + \frac{1}{r_L r_{L-1} \ldots r_1} \right)$$

In the above equation, the term $M_{BF}$ is the memory requirement of the Bloom filters, e is the false positive probability, C is the number of key-value pairs that can be stored in the key-value index, and $r_i$ are the level ratios of the corresponding levels i (described above with reference to the equation for the write amplification level. In some examples, the memory required for the Bloom filters may be inversely proportional to log of false positive ratio, and may be proportional to the capacity of the index. Further, the memory required for the Bloom filters may be inversely proportional to level ratio, such that for a relatively higher level, the impact of the level ratio on the memory requirement is relatively lower. In some examples, the false positive ratio may be determined based on an acceptable level of read amplification (e.g., provided by a user entered parameter). Further, if sufficient memory is available, then the node buffer and the Bloom filter is created for a given node, without regard to other nodes in the same level.

10. Compaction in Key-Value Index

Figure 10:
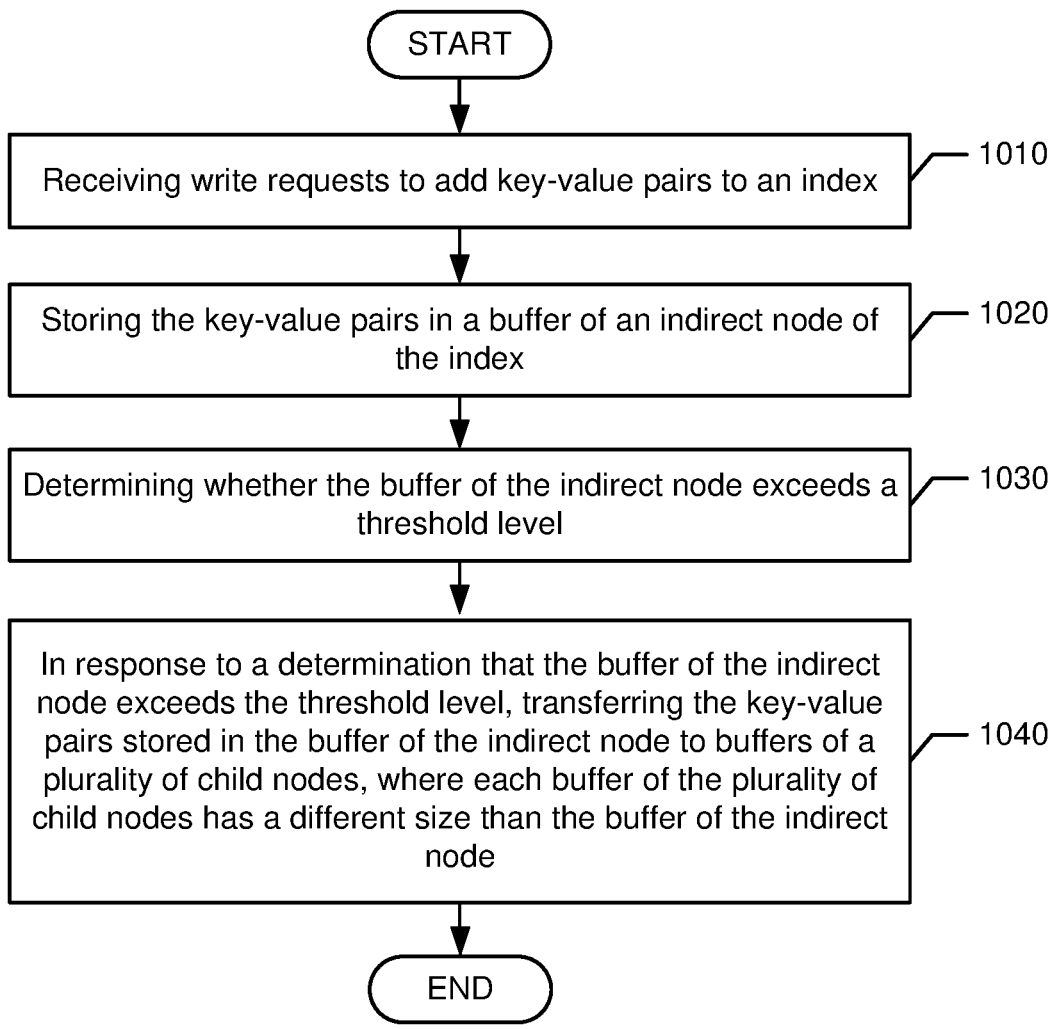
FIG. 10 is an illustration of an example process, in accordance with some implementations.

FIG. 10 shows an example process 1000, in accordance with some implementations. In some examples, the process 1000 may be performed using some or all of the storage controller 110 (shown in FIG. 1A) or storage controller 117 (shown in FIG. 1B). The process 1000 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 1000 may be described below with reference to FIGS. 1A-3B, which show examples in accordance with some implementations. However, other implementations are also possible.

Block 1010 may include receiving write requests to add key-value pairs to an index. For example, referring to FIG. 1A, the update engine 120 may store the update 105 in the update buffer 135, and the merge engine 150 may update the key-value index 145 with key-value pairs stored in the update buffer 135.

Block 1020 may include storing the key-value pairs in a node buffer of an indirect node of the index. For example, referring to FIGS. 1A-3A, the storage controller 110 may store the received key-value pair in the node buffer 340 of root node 211.

Block 1030 may include determining whether the node buffer of the indirect node exceeds a threshold level. Block 1040 may include, in response to a determination that the node buffer of the indirect node exceeds the threshold level, transferring the key-value pairs stored in the node buffer of the indirect node to node buffers of a plurality of child nodes, where each node buffer of the plurality of child nodes has a different size than the node buffer of the indirect node. For example, referring to FIGS. 1A-3A, the storage controller 110 may transfer all key-value pairs from the node buffer 340 of the root node 211 to the node buffers 340 of the child nodes 221-224. In some examples, each of the transferred key-value pairs is distributed to one of the child nodes 221-224 based on different key ranges associated with the child nodes 221-224. Further, in some examples, the node buffer 340 of each of the child nodes 221-224 may be smaller than the node buffer 340 of the root node 211. After block 1030, the process 1000 may be completed.

Figure 11:
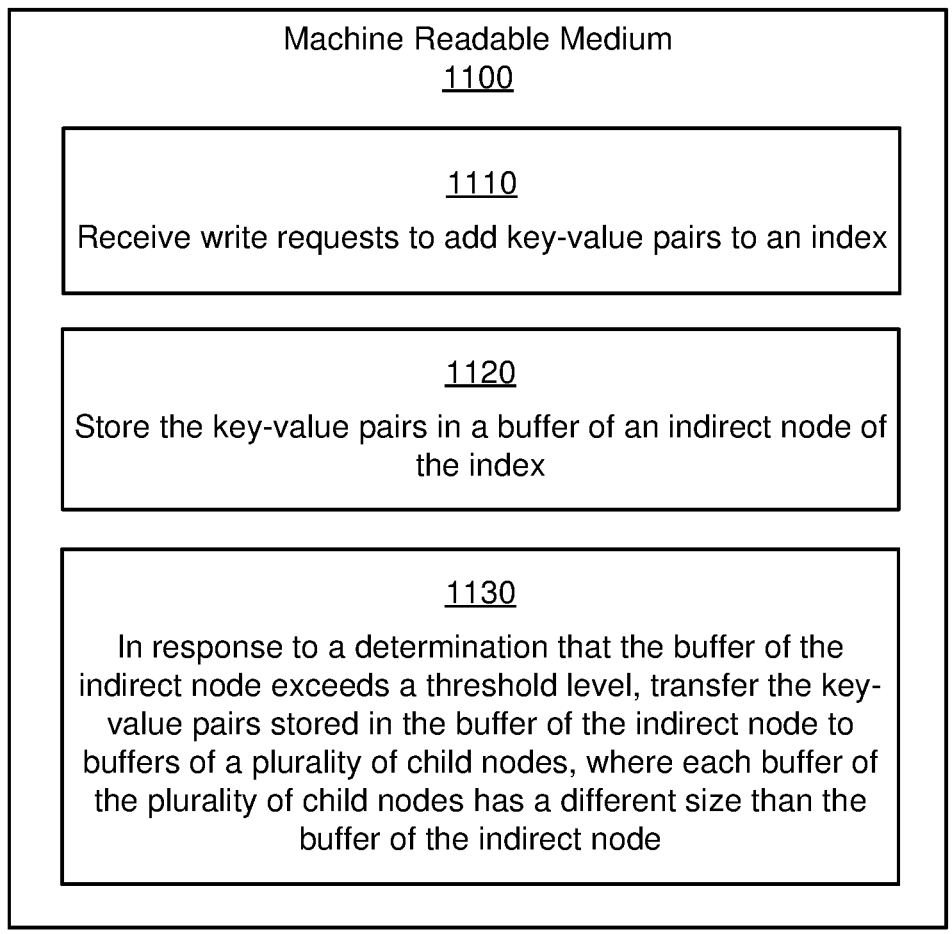
FIG. 11 is a diagram of an example machine-readable medium storing instructions in accordance with some implementations.

FIG. 11 shows a machine-readable medium 1100 storing instructions 1110-1130, in accordance with some implementations. The instructions 1110-1130 can be executed by a single processor, multiple processors, a single processing engine, multiple processing engines, and so forth. The machine-readable medium 1100 may be a non-transitory storage medium, such as an optical, semiconductor, or magnetic storage medium.

Instruction 1110 may be executed to receive write requests to add key-value pairs to an index. Instruction 1120 may be executed to store the key-value pairs in a node buffer of an indirect node of the index. Instruction 1130 may be executed to, in response to a determination that the node buffer of the indirect node exceeds a threshold level, transfer the key-value pairs stored in the node buffer of the indirect node to node buffers of a plurality of child nodes, where each node buffer of the plurality of child nodes has a different size than the node buffer of the indirect node.

Figure 12:
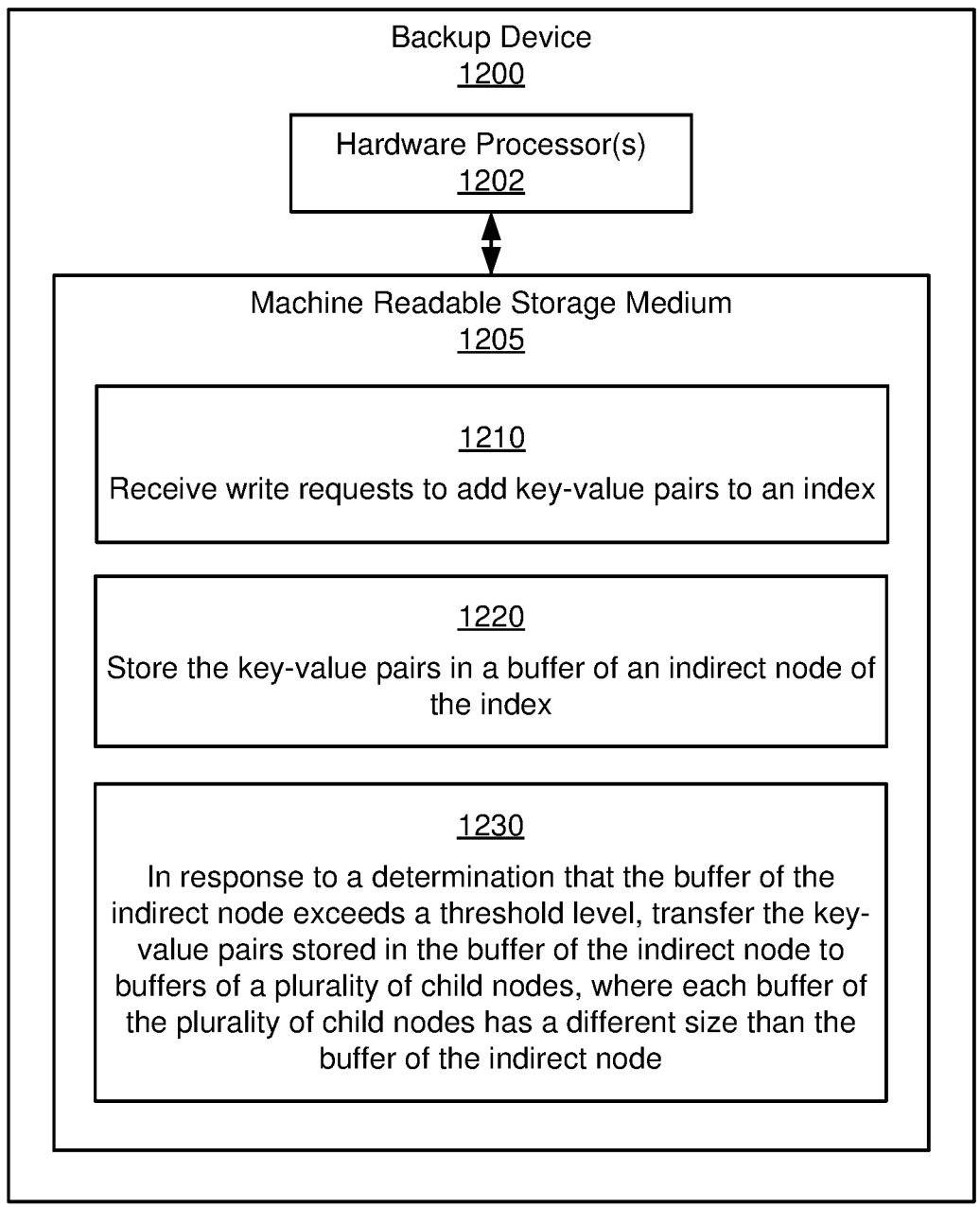
FIG. 12 is a schematic diagram of an example computing device, in accordance with some implementations.

FIG. 12 shows a schematic diagram of an example computing device 1200. In some examples, the computing device 1200 may correspond generally to the storage system 100 (shown in FIG. 1A). As shown, the computing device 1200 may include hardware processor 1202 and machine-readable storage 1205 including instruction 1210-1230. The machine-readable storage 1205 may be a non-transitory medium. The instructions 1210-1230 may be executed by the hardware processor 1202, or by a processing engine included in hardware processor 1202.

Instruction 1210 may be executed to receive write requests to add key-value pairs to an index. Instruction 1220 may be executed to store the key-value pairs in a node buffer of an indirect node of the index. Instruction 1230 may be executed to, in response to a determination that the node buffer of the indirect node exceeds a threshold level, transfer the key-value pairs stored in the node buffer of the indirect node to node buffers of a plurality of child nodes, where each node buffer of the plurality of child nodes has a different size than the node buffer of the indirect node.

11. Bloom Filters in Key-Value Index

Figure 13:
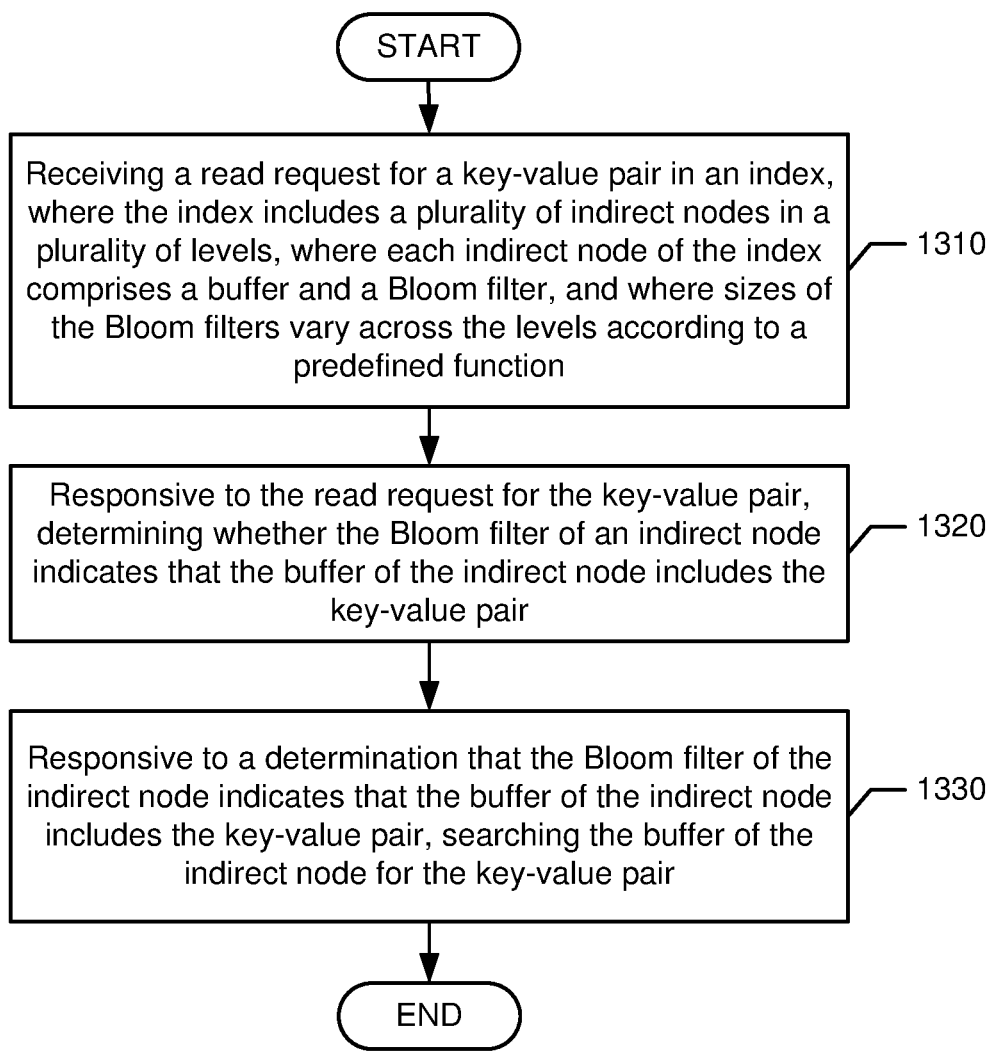
FIG. 13 is an illustration of an example process, in accordance with some implementations.

FIG. 13 shows an example process 1300, in accordance with some implementations. In some examples, the process 1300 may be performed using some or all of the storage controller 110 (shown in FIG. 1A) or storage controller 117 (shown in FIG. 1B). The process 1300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 1300 may be described below with reference to FIGS. 1A-3B, which show examples in accordance with some implementations. However, other implementations are also possible.

Block 1310 may include receiving a read request for a key-value pair in an index, where the index includes a plurality of indirect nodes in a plurality of levels, where each indirect node of the index comprises a node buffer and a Bloom filter, and where sizes of the Bloom filters vary across the levels according to a predefined function. For example, referring to FIGS. 1A-3, the query engine 160 may receive a query 165 specifying a particular key. In response to the query 165, the query engine 160 may search for the particular key by analyzing or reading nodes of the key-value index 145 in a top-down pattern. In some examples, each indirect node of the key-value index 145 may include a node buffer 340 and a Bloom filter 330. The sizes of the Bloom filters 330 in different levels of indirect nodes may be based on different false positive ratios associated with the different levels of the index 145. In some examples, higher levels of the index 145 have relatively smaller false positive ratios than lower levels of the index 145. Further, in some examples, the Bloom filter sizes may vary according to a predefined function based on the false positive ratio of the associated level (e.g., the Bloom filter size may be inversely proportional to the natural log of the false positive rate of that Bloom filter).

Block 1320 may include, responsive to the read request for the key-value pair, determining whether the Bloom filter of an indirect node indicates that the node buffer of the indirect node includes the key-value pair. For example, referring to FIGS. 1A-3A, the storage controller 110 may determine whether the Bloom filter 330 of the root node 211 indicates that the node buffer 340 of the root node 211 includes the key-value pair.

Block 1330 may include, responsive to a determination that the Bloom filter of the indirect node indicates that the node buffer of the indirect node includes the key-value pair, searching the node buffer of the indirect node for the key-value pair. For example, referring to FIGS. 1A-3A, the storage controller 110 may determine that the Bloom filter 330 of the root node 211 indicates that the node buffer 340 of the root node 211 includes the key-value pair, and in response may search the node buffer 340 for the key-value pair. After block 1330, the process 1300 may be completed.

FIG. 14 shows a machine-readable medium 1400 storing instructions 1410-1430, in accordance with some implementations. The instructions 1410-1430 can be executed by a single processor, multiple processors, a single processing engine, multiple processing engines, and so forth. The machine-readable medium 1400 may be a non-transitory storage medium, such as an optical, semiconductor, or magnetic storage medium.

Instruction 1410 may be executed to receive a read request for a key-value pair in an index, where the index includes a plurality of indirect nodes in a plurality of levels, where each indirect node of the index comprises a node buffer and a Bloom filter, and where sizes of the Bloom filters vary across the levels according to a predefined function. Instruction 1420 may be executed to, responsive to the read request for the key-value pair, determine whether the Bloom filter of the indirect node indicates that the node buffer of the indirect node includes the key-value pair. Instruction 1430 may be executed to, responsive to a determination that the Bloom filter of the indirect node indicates that the node buffer of the indirect node includes the key-value pair, search the node buffer of the indirect node for the key-value pair.

Figure 15:
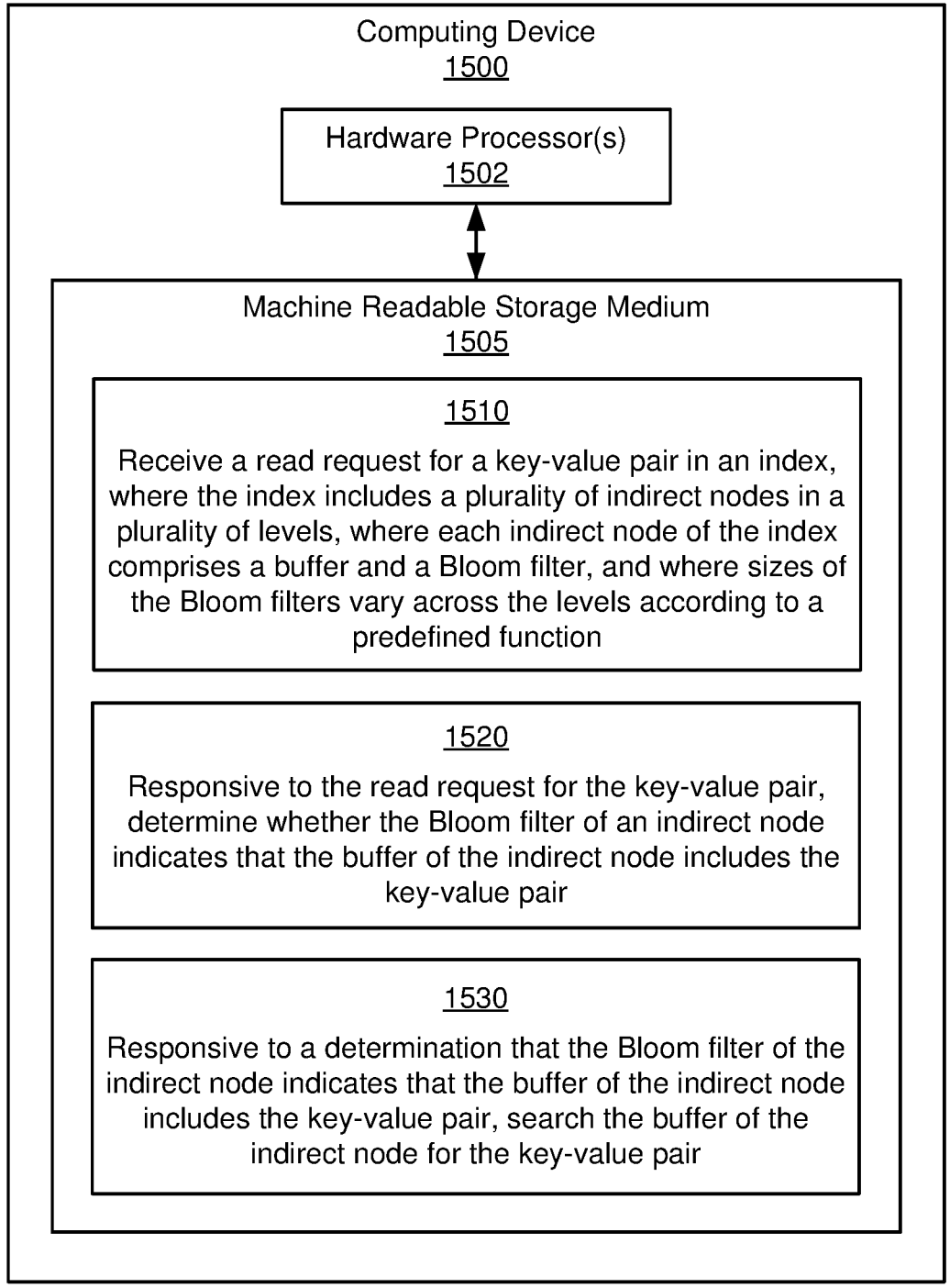
FIG. 15 is a schematic diagram of an example computing device, in accordance with some implementations.

FIG. 15 shows a schematic diagram of an example computing device 1500. In some examples, the computing device 1500 may correspond generally to the storage system 100 (shown in FIG. 1A). As shown, the computing device 1500 may include hardware processor 1502 and machine-readable storage 1505 including instruction 1510-1530. The machine-readable storage 1505 may be a non-transitory medium. The instructions 1510-1530 may be executed by the hardware processor 1502, or by a processing engine included in hardware processor 1502.

Instruction 1510 may be executed to receive a read request for a key-value pair in an index, where the index includes a plurality of indirect nodes in a plurality of levels, where each indirect node of the index comprises a node buffer and a Bloom filter, and where sizes of the Bloom filters vary across the levels according to a predefined function. Instruction 1520 may be executed to, responsive to the read request for the key-value pair, determine whether the Bloom filter of the indirect node indicates that the node buffer of the indirect node includes the key-value pair. Instruction 1530 may be executed to, responsive to a determination that the Bloom filter of the indirect node indicates that the node buffer of the indirect node includes the key-value pair, search the node buffer of the indirect node for the key-value pair.

Note that, while FIGS. 1A-15 show various examples, implementations are not limited in this regard. For example, referring to FIG. 1A, it is contemplated that the storage system 100 may include additional devices and/or components, fewer components, different components, different arrangements, and so forth. In another example, it is contemplated that update engine 120 and the query engine 160 may be combined into a single engine or unit, or may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computer implemented method, comprising:
  receiving write requests to add key-value pairs to an index;
  storing the key-value pairs in a buffer of an indirect node of the index;
  determining whether the buffer of the indirect node exceeds a threshold level;
  in response to a determination that the buffer of the indirect node exceeds the threshold level, transferring the key-value pairs stored in the buffer of the indirect node to buffers of a plurality of child nodes, wherein each buffer of the plurality of child nodes is smaller than the buffer of the indirect node;
  detecting a sequential load of key-value pairs into the index while in a first operating mode;
  in response to detection of the sequential load, changing the index into a second operating mode, wherein the second operating mode does not use node buffers of indirect nodes of the index; and
  adding the sequential load to the index while in the second operating mode.

2. The computer implemented method of claim 1, including:
  determining a buffer size for the plurality of child nodes based on a level ratio, wherein the level ratio is a computed ratio between total buffer sizes in two adjacent levels of the index.

3. The computer implemented method of claim 2, including:
  determining a Bloom filter size for the plurality of child nodes based on a false positive ratio, wherein the false positive ratio is specific to a level of the plurality of child nodes in the index.

4. The computer implemented method of claim 3, including:
  initializing the plurality of child nodes using the determined buffer size and the determined Bloom filter size.

5. The computer implemented method of claim 1, including:
for each child node of the plurality of child nodes, setting a Bloom filter of the child node to indicate which of key-value pairs were transferred to the buffer of the child node.

6. The computer implemented method of claim 1, including:
in response to the determination that the buffer of the indirect node exceeds the threshold level, scheduling a compaction of the indirect node with a first priority for background execution, wherein executing the compaction includes transferring the key-value pairs from the buffer of the indirect node to the buffers of the plurality of child nodes;
while waiting for execution of the compaction, continuing to add key-value pairs to the buffer of the indirect node; and
in response to a determination that the buffer of the indirect node exceeds additional threshold, increasing the priority of the scheduled compaction of the indirect node.

7. The computer implemented of claim 1, wherein, in the second operating mode, the key-value pairs are stored in leaf nodes of the index, and the indirect nodes identify a leaf node that stores a particular one of the key-value pairs.

8. The computer implemented of claim 1, further comprising, while in the second operating mode:
flushing, down to the leaf nodes, any key-value pairs in node buffers of the indirect nodes that match or overlap the sequential load.

9. A non-transitory machine-readable medium storing instructions that upon execution cause a processor to:
receive write requests to add key-value pairs to an index;
store the key-value pairs in a buffer of an indirect node of the index; and
in response to a determination that the buffer of the indirect node exceeds the threshold level, transfer the key-value pairs stored in the buffer of the indirect node to buffers of a plurality of child nodes, wherein each buffer of the plurality of child nodes is smaller than the buffer of the indirect node;
detect a sequential load of key-value pairs into the index while in a first operating mode;
in response to detection of the sequential load, change the index into a second operating mode, wherein the second operating mode does not use node buffers of indirect nodes of the index; and
add the sequential load to the index while in the second operating mode.

10. The non-transitory machine-readable medium of claim 9, including instructions that upon execution cause the processor to:
determine a buffer size for the plurality of child nodes based on a level ratio, wherein the level ratio is a computed ratio between total buffer sizes in two adjacent levels of the index.

11. The non-transitory machine-readable medium of claim 10, including instructions that upon execution cause the processor to:
determine a Bloom filter size for the plurality of child nodes based on a false positive ratio, wherein the false positive ratio is specific to a level of the plurality of child nodes in the index.

12. The non-transitory machine-readable medium of claim 11, including instructions that upon execution cause the processor to:
initialize the plurality of child nodes using the determined buffer size and the determined Bloom filter size.

13. The non-transitory machine-readable medium of claim 9, including instructions that upon execution cause the processor to:
for each child node of the plurality of child nodes, set a Bloom filter of the child node to indicate which of key-value pairs were transferred to the buffer of the child node.

14. The non-transitory machine-readable medium of claim 9, including instructions that upon execution cause the processor to:
in response to the determination that the buffer of the indirect node exceeds the threshold level, schedule a compaction of the indirect node with a first priority for background execution, wherein executing the compaction includes transferring the key-value pairs from the buffer of the indirect node to the buffers of the plurality of child nodes;
while waiting for execution of the compaction, continue to add key-value pairs to the buffer of the indirect node; and
in response to a determination that the buffer of the indirect node exceeds additional threshold, increase the priority of the scheduled compaction of the indirect node.

15. A storage system comprising:
a processor comprising a plurality of processing engines; and
a machine-readable storage storing instructions, the instructions executable by the processor to:
receive write requests to add key-value pairs to an index;
store the key-value pairs in a buffer of an indirect node of the index; and
in response to a determination that the buffer of the indirect node exceeds the threshold level:
schedule a compaction of the indirect node with a first priority for background execution, wherein executing the compaction includes transferring the key-value pairs from the buffer of the indirect node to the buffers of the plurality of child nodes;
while waiting for execution of the compaction, continue to add key-value pairs to the buffer of the indirect node; and
in response to a determination that the buffer of the indirect node exceeds additional threshold, increase the priority of the scheduled compaction of the indirect node; and
perform the scheduled compaction including transferring transfer the key-value pairs stored in the buffer of the indirect node to buffers of a plurality of child nodes, wherein each buffer of the plurality of child nodes is smaller than the buffer of the indirect node.

16. The storage system of claim 15, the instructions executable by the processor to:
determine a buffer size for the plurality of child nodes based on a level ratio, wherein the level ratio is a computed ratio between total buffer sizes in two adjacent levels of the index.

17. The storage system of claim 16, the instructions executable by the processor to:
determine a Bloom filter size for the plurality of child nodes based on a false positive ratio, wherein the false positive ratio is specific to a level of the plurality of child nodes in the index.

18. The storage system of claim 17, the instructions executable by the processor to:
   initialize the plurality of child nodes using the determined buffer size and the determined Bloom filter size.

19. The storage system of claim 15, the instructions executable by the processor to:
   for each child node of the plurality of child nodes, set a Bloom filter of the child node to indicate which of key-value pairs were transferred to the buffer of the child node.

20. The storage system of claim 15, including instructions executable by the processor to:
   detect a sequential load of key-value pairs into the index while in a first operating mode;
   in response to detection of the sequential load, change the index into a second operating mode, wherein the second operating mode does not use node buffers of indirect nodes of the index; and
   add the sequential load to the index while in the second operating mode.

\* \* \* \* \*